United States Patent [19]
Conte et al.

[11] Patent Number: 5,845,065
[45] Date of Patent: Dec. 1, 1998

[54] NETWORK LICENSE COMPLIANCE APPARATUS AND METHOD

[75] Inventors: Brian Conte, Seattle; Christine Hui, Bothell; Roger Key, Redmond, all of Wash.

[73] Assignee: WRQ, Inc., Seattle, Wash.

[21] Appl. No.: 340,263

[22] Filed: Nov. 15, 1994

[51] Int. Cl.⁶ .................................................. G06F 11/00
[52] U.S. Cl. ........................................ 395/186; 707/104
[58] Field of Search .............................. 395/186, 187.01, 395/712, 609, 619; 364/286; 707/100, 104

[56] References Cited

U.S. PATENT DOCUMENTS

| | | | |
|---|---|---|---|
| 4,438,508 | 3/1984 | Wyman | 380/4 |
| 4,937,863 | 6/1990 | Robert et al. | 380/4 |
| 4,977,594 | 12/1990 | Shear | 380/4 |
| 5,008,814 | 4/1991 | Mathur | 364/200 |
| 5,049,873 | 9/1991 | Robins et al. | 340/825.06 |
| 5,204,897 | 4/1993 | Wyman | 380/4 |
| 5,260,999 | 11/1993 | Wyman | 380/4 |
| 5,390,297 | 2/1995 | Barber et al. | 380/4 |
| 5,438,508 | 8/1995 | Wyman | 364/401 |
| 5,553,143 | 9/1996 | Ross et al. | 380/25 |

OTHER PUBLICATIONS

Tally Systems advertisement, "CentaMeter Features & Benefits".
Frye Computer Systems, Inc. advertisement, "Software Metering And Resource Tracking for Netware".
Funk Software Inc. advertisement, "AppMeter Technical Overview".
Brightwork Development, Inc. advertisement, "Brightwork FUSION The Easy-to-Use, Integrated Software Management Solution From The Network Utilities Experts".
ON Technology Corporation advertisement, "John T. McCann's SofTrack".
Nutter, "SofTrack", *NetWare Solutions*, Nov. 1993, vol. 3, No. 2.
Dryden, "SofTrack Keeps an Eye on Your Network", *LAN Times*, Nov. 1, 1993, vol. 10, No. 22.
Saber Software Corporation advertisement, "Saber Enterprise Application Manager".
Symantec Corporation advertisement, "Symantec. The Norton Administrator For Networks".
Trellis Group, Inc. advertisement, "Application Meter Software Metering for Applications on VINES Networks".

*Primary Examiner*—Albert DeCady
*Attorney, Agent, or Firm*—Graybeal Jackson Haley LLP

[57] ABSTRACT

A method and apparatus for controlling operation of remote networked devices, such as computers, in compliance with licensed restrictions is provided. In one embodiment, licenses are assigned to users in the order of application requests that are made. When a request is made and no licenses are available, an analysis is performed to determined whether licenses may be swapped in such a fashion so as to free up a license for the requested application. In another embodiment, whenever a new request is made, an analysis performed by considering the needs of users. Information needed to perform the analysis is stored in the database which is updated when a new program launch occurs.

33 Claims, 36 Drawing Sheets

| SUITE NAME | LICENSE NUMBER | FIRST APPLICATION | | SECOND APPLICATION | | THIRD APPLICATION | |
|---|---|---|---|---|---|---|---|
| | | NAME | ASS'D TO | NAME | ASS'D TO | NAME | ASS'D TO |
| SUITE LICENSES | | | | | | | |
| S1 | 1 | A1 | U2 | A2 | | A3 | |
| S2 | 1 | A4 | | A5 | | | |
| S3 | 1 | A6 | | A7 | | | |
| S3 | 2 | A6 | | A7 | | | |
| ⋮ | | | | | | | |
| Sn | 1 | Ay | | Az | | | |
| SINGLE LISENSES | | | | | | | |
| | 1 | A1 | U1 | | | | |
| | 1 | A3 | | | | | |
| ⋮ | | | | | | | |
| | 1 | Az | | | | | |

FIG. 4A

| SUITE NAME | LICENSE NUMBER | FIRST APPLICATION | | SECOND APPLICATION | | THIRD APPLICATION | |
| --- | --- | --- | --- | --- | --- | --- | --- |
| | | NAME | ASS'D TO | NAME | ASS'D TO | NAME | ASS'D TO |
| SUITE LICENSES | | | | | | | |
| S1 | 1 | A1 | U1 | A2 | U1 | A3 | |
| S2 | 1 | A4 | | A5 | | | |
| S3 | 1 | A6 | | A7 | | | |
| S3 | 2 | A6 | | A7 | | | |
| ⋮ | | | | | | | |
| Sn | 1 | Ay | | Az | | | |
| SINGLE LISENSES | | | | | | | |
| | 1 | A1 | U2 | | | | |
| | 1 | A3 | | | | | |
| ⋮ | | | | | | | |
| | 1 | Az | | | | | |

522 points to the SUITE LICENSES section; 520 points to the SINGLE LISENSES section.

FIG. 4B

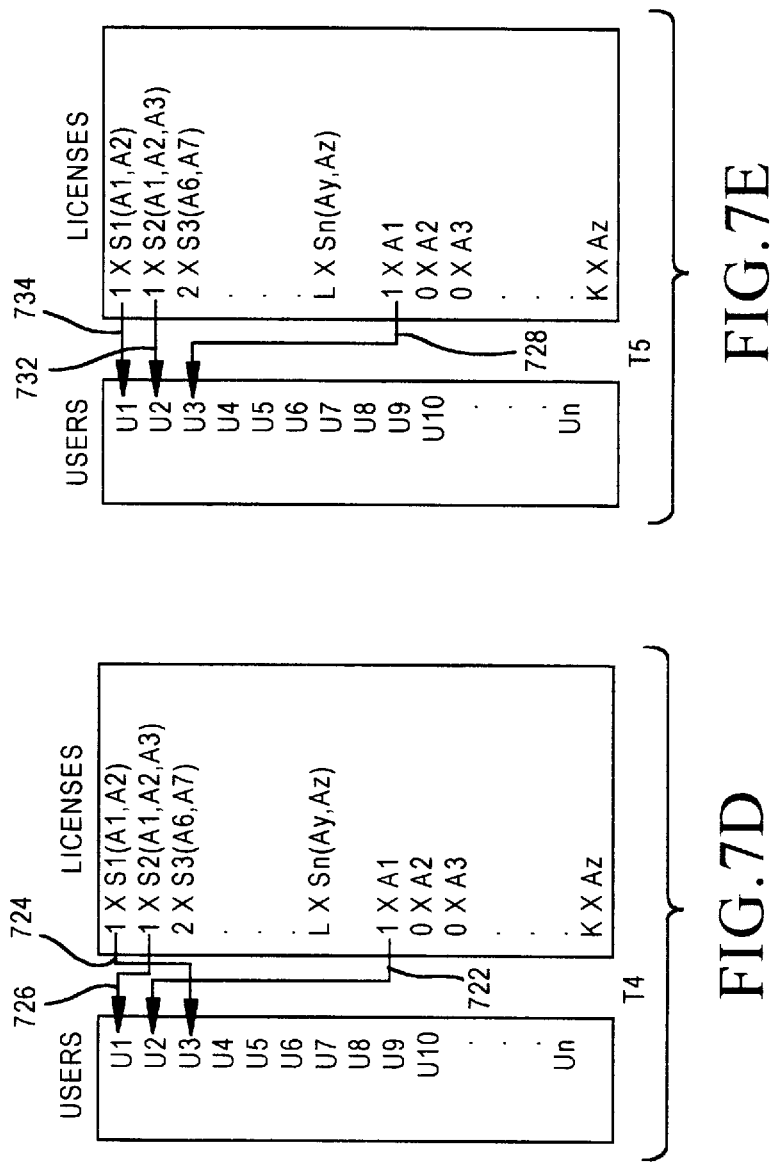

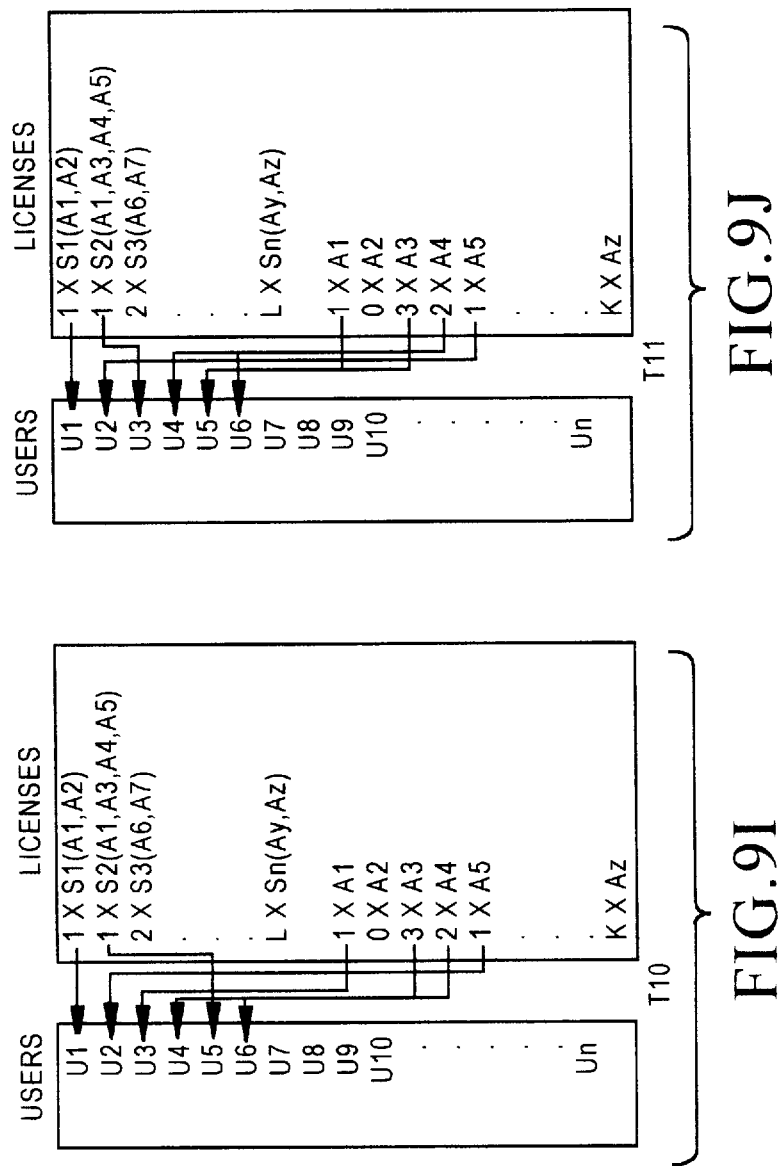

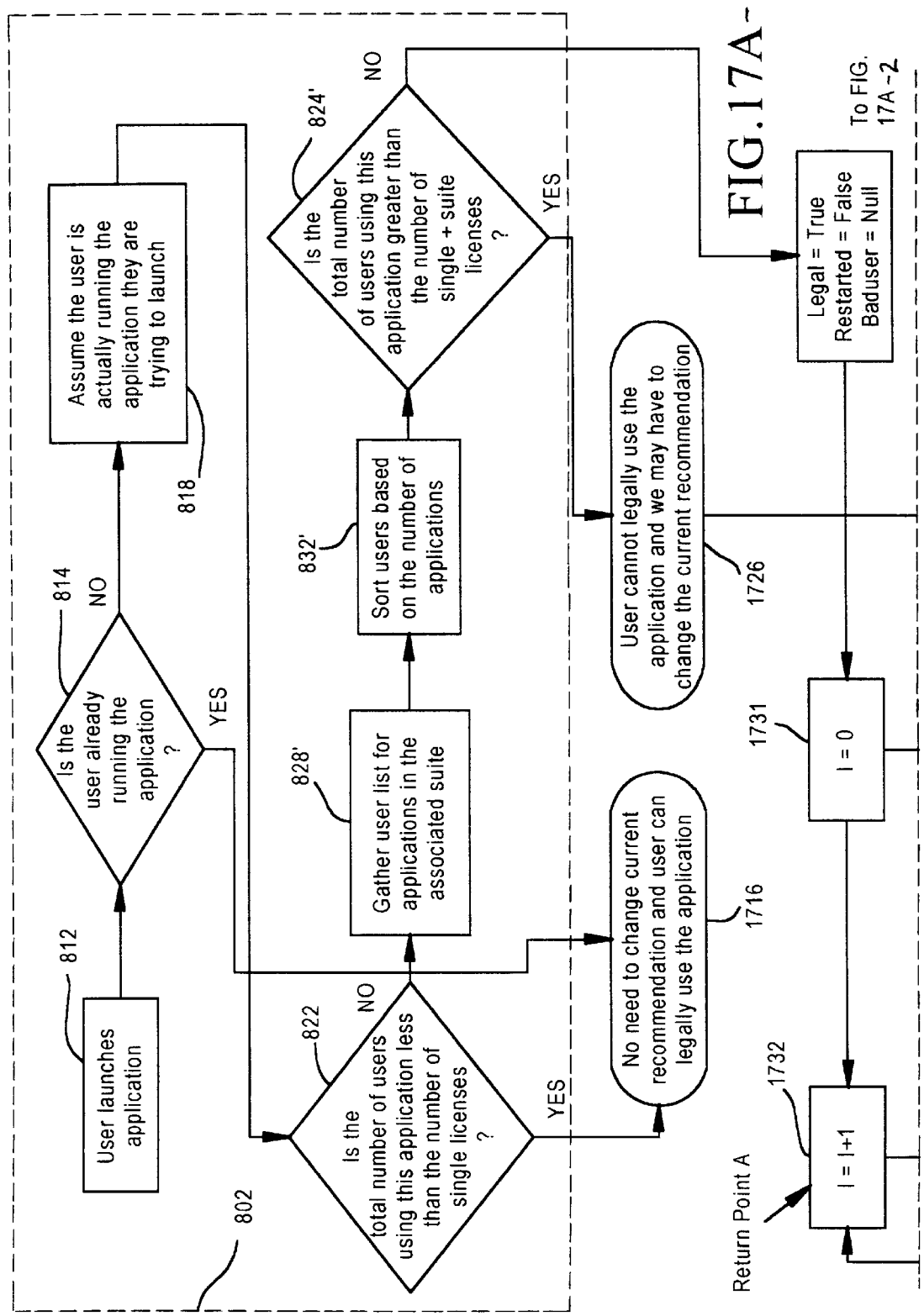

NETWORK LICENSE COMPLIANCE APPARATUS AND METHOD

The present invention is directed to a method and apparatus wherein a computer controls the operation of a mechanism according to predefined rules and in particular wherein a computer assures compliance with software licenses including suite licenses.

BACKGROUND OF THE INVENTION

It is common for a plurality of computers in a network to be configured such that one or more executable computer programs are stored (typically in the server hard disk) in such a way that the program can, at a user's request be executed (or "launched") and/or results displayed on any of the network client computers. Many computer programs are provided under the terms of a license agreement which limits the number of users who are permitted to run a program at a given time. For example, a given program may be licensed with a limit of two users at a time. In a typical situation, some or all of the executable files (i.e., stored, source or object level software) will be stored in the hard disk 112 of the network server 114 of the network depicted in FIG. 1. Related files such as data files, configuration files and the like may be stored on the server disk 112, or some of the files may be stored in the disk memory 118a, 118b or other storage means of the client computers 120a, 120b. The server 114 and client computers 120a, 120b are coupled using network software and hardware, including network media 122. A number of types of networks and media can be used, including token ring networks, Ethernet networks, Applelink networks, and a number of media 122 can be used including coaxial cable, twisted pair, optical fiber, or infrared or radio links in the case of "wireless" networks.

When a user working on the first client computer 120a wishes to use a program, the client computer 120a, in response to the user's entry of the appropriate commands, will determine whether the requested program can be launched. In most cases, in order for the program to execute, executable code must be copied into the random access memory 124a of the client computer 120a. Typically, the code will reside either on the hard disk of the client computer or on the hard disk of the server computer. In some cases, it might be possible for some or all of the executable code to be run by the server computer or even, in a multiprogramming-configured network, by one or more of the other client computers 120b, in which case program code may be copied into the RAM 124b of the other client computer 120b or server 126, with the results being sent to the first client computer e.g., for display.

In some previous network configurations, the server 114 is configured to assure that network licenses are not violated. Of course, some networks may be configured such that license compliance is not monitored or otherwise assured. In networks in which network compliance is assured, one method for doing so involves configuring the network such that when one client is using a given executable file, no other user on the network is permitted to "launch" (i.e., begin execution of) the same application or program. Thus, if a given program is licensed for two uses, two copies, and only two copies, of the program will be stored on the disk 112 and the server 114 will not permit more than one user at a time to access any executable files on the disk 112, thus assuring compliance with the license. This system, however, has the disadvantage that it requires a relatively large amount of disk storage space 112, particularly when a large number of licenses of a given program are provided.

Another approach is to make use of network "share points". A share point is a setable network parameter which establishes a maximum number of network users that can access a given drive. A "phantom" drive is established on the network for storing a given licensed program with the set point for the phantom drive being equal to the number of licensed users for that software.

Another difficulty with previous license control systems is the inability to accommodate, or to accommodate efficiently, so-called suites of programs. A program suite is a group of programs which are licensed (and, typically, packaged and sold) together, even though a user is able to and, often may wish to, use fewer than all of the programs in the suite at a given time. Examples of software suites include the groups of programs sold under the trade names Microsoft® Office™, Microsoft® Office Professional™ (which includes all of the components of Microsoft Office plus Access™) and Lotus® Smart Suite (which includes the programs "123", "AMI Pro", "CC:Mail", "Freelance Graphics", and "Organizer").

In at least some situations, a suite of applications is provided with a "one for all and all for one" license, i.e., such that by purchasing one suite license, a user can use one, many or all of the programs in the suite at the same time, and still be within the license agreement. However, under many suite license agreements, for a given single suite license, if one user is using a program from the suite, there is no provision for a second user to be able to use another program from the suite which is not currently being used by the first user. This scenario is not easily accommodated by the license control system described above since each of the applications in the suite will typically have its own executable file or files and there is no simple provision for preventing a second user from accessing an unused executable file after a first user has accessed a first executable file from the suite.

Many of the systems established for monitoring or controlling network software for compliance with licenses are not configured to accommodate suite licenses or are not configured to accommodate a situation in which a network has two versions of a program, one as a "stand alone" single application and another as a part of a suite, each with its own type of license.

Furthermore, previous license control systems have been unable to consistently manage the licenses to provide for efficiency, i.e., so that no users who request access to a program are denied access on the basis of a less-than-optimal analysis of license availability. A simple example illustrates the general problem. Suppose the network server 114 contains two copies of program A, the first copy having a single-application license and the second copy having a license for a suite which contains programs A and B. If a first user requests a launch of application A, the license monitoring system may "assign" either the first (single application) license or the second (suite) license to the first user. If the system assigns the suite license to the first user, a second user who requests application B will be foreclosed from using application B since it is only available as part of the suite license and the suite license is already being used. As will be clear to those of skill in the art, the situation rapidly becomes difficult to analyze and solve in a network which has multiple users, multiple licenses, some of which are suite licenses and some of which may overlap with individual and/or suite licenses.

Because some or all previous systems have been unable to consistently monitor and control software usage in a fashion which is efficient (i.e., such that no users are denied access to a program if access is available under some possible arrangement of licenses) there is a need for a system which can control or communicate with devices such as networked computers in a fashion which can accommodate both suite licenses and individual licenses, which is efficient so that a requested application launch is seldom or never erroneously denied and which operates rapidly so that the user requesting an application launch experiences a small or minimum delay during the analysis procedure.

SUMMARY OF THE INVENTION

The present invention monitors and controls network software launches to assure compliance with software licenses which can include both individual licenses and suite licenses. Preferably, the system controls application launches in a fashion which is efficient, i.e. in which there are no "wasted license" situations in which a user is denied access to a requested program even though, by the proper analysis or assignment of licenses, the request could be accommodated.

According to one embodiment of the invention, licenses are assigned to users as each user requests a launch of an application. When a user (the "requesting user") requests a launch of an application (the "requested application") if there are no unassigned licenses for the requested application, the system will attempt to reassign or "swap" existing license assignments in order to free-up the license for the requested application.

Although the invention is described herein, in certain instances, in terms of actions taken by users, or assumptions made or items considered, those of skill in the art will be able to understand from context when these references mean that a computing device is controlled by software to perform certain analyses, and how such software can be provided. According to a second embodiment, there is no need to assign specific licenses to specific users. Instead, each time a user requests an application launch, the system initiates a analysis "from scratch" (i.e., without the need for information about previous license "assignments" to particular users) which will determine whether or not there is at least one license assignment scenario which can accommodate the new application request (as well as all of the currently running applications). If there is such a scenario, the server sends signals to the proper client computer which permit the new user to launch the desired application. However, since, with each new application launch request, the analysis begins anew there is never a need to store (past the analysis stage) an indication of which user or which running application is covered by which license (although such an assignment of licenses can be stored if desired).

In one embodiment, the system is configured to accommodate situations in which there is at least one application which is covered by (a) an individual license and (b) at least two suite licenses, where one suite is a superset of another suite (i.e. one suite contains all the applications contained in the other suite, plus at least one additional application). This embodiment will also accommodate the simple suite situation in which no application belongs to two different suites (i.e. suites which have different component applications). In this embodiment, the current and requesting users are considered in order of the number of suite applications (i.e. applications contained in at least one suite) which the user is running (or has requested). These users' needs are satisfied with single licenses, if available, and, if not, are given a suite license or a combination of suite and single licenses, if available, whichever wastes the least number of application licenses. A wasted license occurs for each application in a suite license assigned to a user which the user is not running. If there is a user who can not be accommodated by this system, then it is concluded that the request for an application launch can not be accommodated, and that request is denied.

In another embodiment, the system is configured to accommodate situations in which there may be overlapping suites, i.e., in which there may be at least two suites, which are different, non-superset suites of applications, that have an application in common. This embodiment will also accommodate the less complex situations involving superset suites and simple suites. In this embodiment, the users are sorted in ascending order of the number of suite applications they are currently running (including the requested application). A first pass through this sorted list is made during which a user is given the appropriate license if (a) thus user is running only a single application for which a single license is available, or (b) if the user's needs would be filled by a single suite license and no license would be wasted by assigning such suite license, or (c) there is only one choice of license available for the user. Although this description of the invention states that the user is "licensed" or is "given" a license, it will be understood that the license assignment need only be made for purposes of the analysis, i.e. to determine whether a requesting user may launch an application, and that there is no need to permanently assign a particular license or group of licenses to a particular user or to store the analysis assignments after the decision to permit or deny launch of a requested application is made (though such permanent assignments and/or storage may be made if desired). One or more additional passes for not-yet licensed users in the list are made, until a pass through the list results in no new license assignments (or until all current and requesting users have been licensed). The remaining users, if any, are collected in a second list and sorted in ascending order of the number of licensing options available to that user. The users in this list are considered in order, and the options available to them are made on a "trial basis" using a tree-like analysis scheme, to determine if there is any combination of available options for the remaining users that will allow licensing of all the remaining users. During the analysis, options for a particular user are tried in ascending order of the number of wasted licenses that would occur under such option. Next, preference is given to those options that would use licenses from applications or suites that have the greatest number of licenses currently available. When a trial option is assigned to a user, the analysis then proceeds to the next user in the sorted list to see if there are options currently available for that user, and if so, a trial assignment is made. If the analysis reaches a point where there are no options available for a user, the system returns to the previous user in the list and tries another option (if any untried options still remain for that user). If the analysis reaches a point at which all options have been tried for the first user in the list, and no legal licenses are available which are consistent with licensing all other users in the second list, then it is concluded that the request for an application launch can not be accommodated, and that request is denied.

According to another embodiment of the invention, an analysis is done to determine what the most efficient set of licenses would be for the typical use of applications on the system.

According to another embodiment of the invention, users who are denied a program launch are placed on a waiting list and are given the opportunity to launch a requested application in a manner which avoids unfairness.

According to another embodiment of the invention, an analysis is provided on a network which does not control application launches, but keeps track of the performance that would be obtained if the present method of control was implemented.

According to another embodiment of the invention, an analysis is provided on the network which does not execute all features of the present invention, and which can be configured to execute additional features upon input of a predetermined password.

According to another embodiment, the analysis is performed substantially on network client stations in a fashion that is independent of the network configuration so as to be able to execute on a plurality of different network platforms.

BRIEF DESCRIPTION OF THE DRAWINGS

FIGS. 4A and 4B are schematic depictions of database information which can be used in the embodiment of FIG. 3;

FIGS. 7A–7E depict an analysis of users and licenses according to an embodiment of the present invention;

FIGS. 9A–9J depict an analysis of users and licenses according to an embodiment of the present invention

DESCRIPTION OF THE PREFERRED EMBODIMENTS

Figure 1:
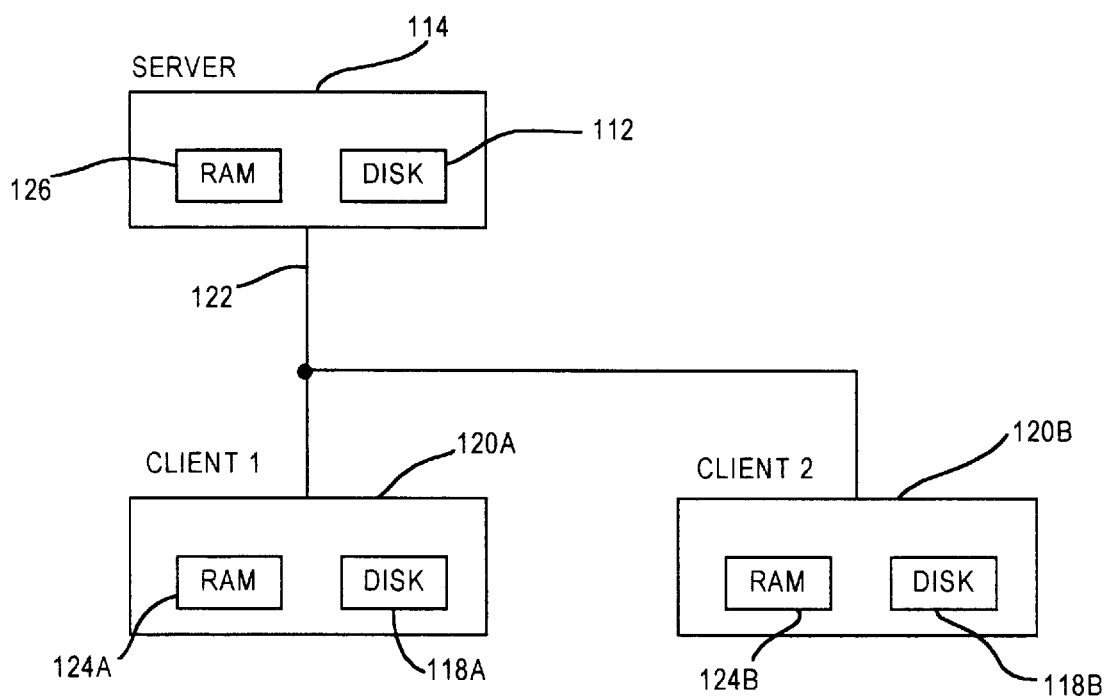
FIG. 1 is a block diagram showing a network which can be used in connection with embodiments of the present invention.
Figure 2C:
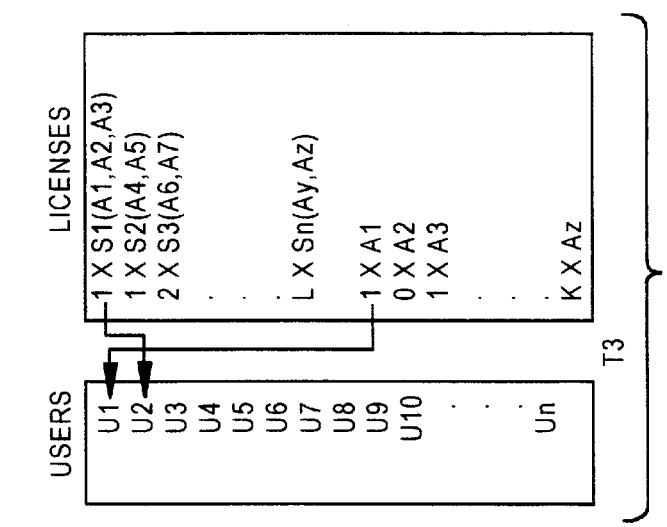
FIGS. 2A–2C depict assignments of licenses according to previous methods.
Figure 2B:
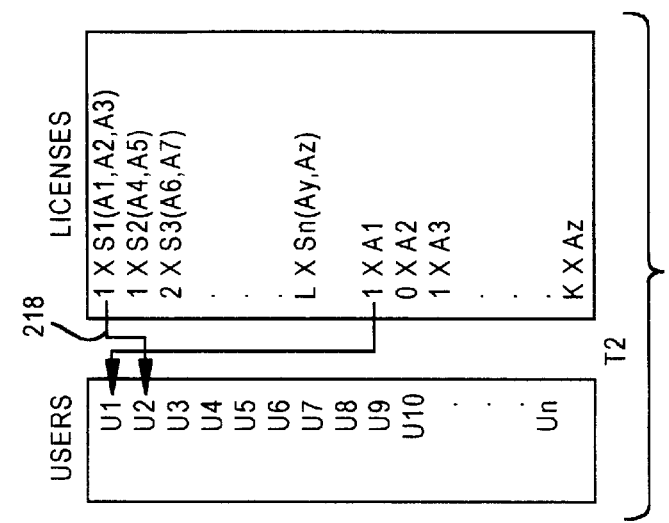
Figure 2A:
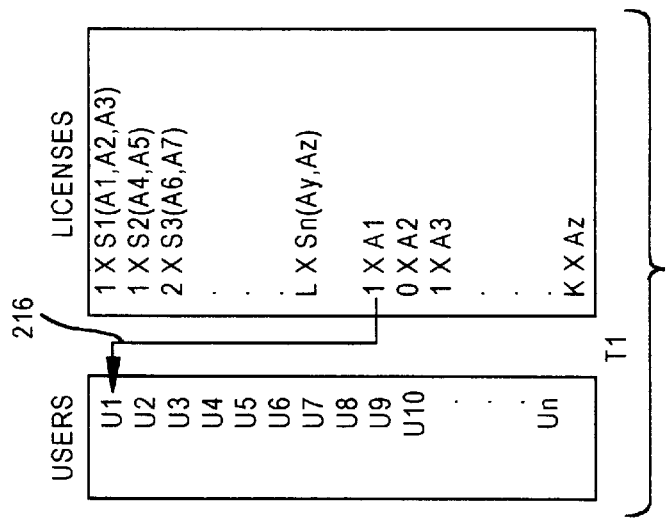

FIGS. 2A–2C depict the results of certain previously-available licensing schemes. In FIGS. 2A–2C, there is a list of n users who have logged on to the system in the left column (indicated in the figures by U1 through Un) and a list of licenses available, in the right column. Some licenses are suite licenses. In this illustration, there is a single suite license available for suite 1 (indicated in the figure by the notation "1×S1"). Suite 1 contains three applications: A1, A2 and A3 (indicated in the figures by the notation "S1(A1, A2, A3)"). As seen from FIGS. 2A–2C, in this illustration, there is also one suite license available for suite S2 (which contains applications A4 and A5), two suite licenses available for S3 (which contains applications A6 and A7), L suite licenses available for suite Sn, one single license available for each of application A1 and A3, no single licenses available for applications A2 and K single licenses available for application Az. In the example of FIG. 2, at time T1, user U1 requests launch of application A1. In response, the server assigns the single A1 license to U1 (e.g. by making an appropriate entry in a database, such as that depicted schematically in FIG. 4A), indicated in FIG. 2A by the arrows 216 and the software associated with the license control system, permits U1 to launch application A1. At time T2, user U2 requests launch of application A1 and the S1 license is assigned to U2, as depicted by the arrow 218 in FIG. 2B and A1 is launched. At time T3, user U1 requests application A2. As can be seen from FIG. 2C, there is no currently unused license available for application A2 (since the S1 license is being used by U2) and, according to some previous systems, the request of U1 for A2 would be denied, despite the fact that U2 is not currently using application A2, but only A1.

Figure 5C:
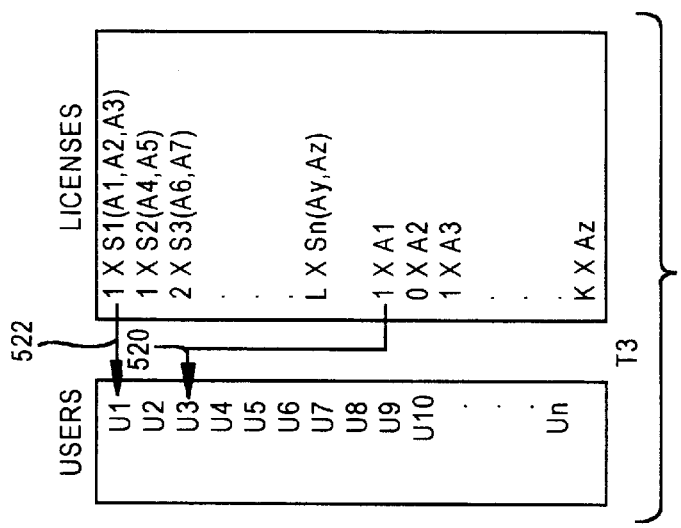
FIGS. 5A–5C depict assignments of licenses to users in accordance with an embodiment of the present invention.
Figure 5B:
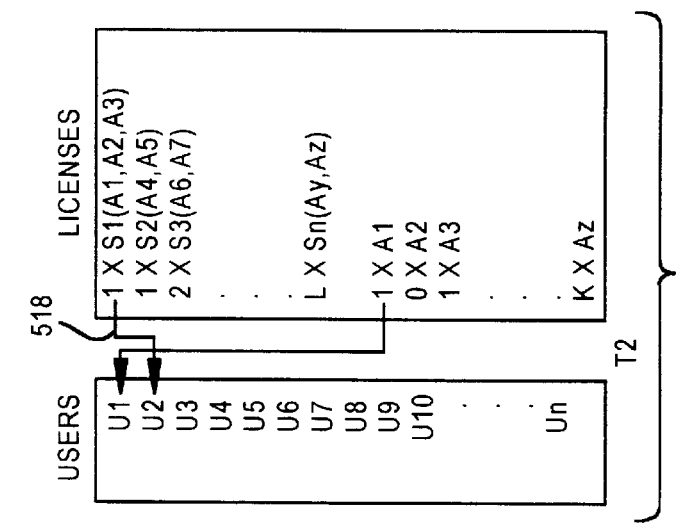
Figure 5A:
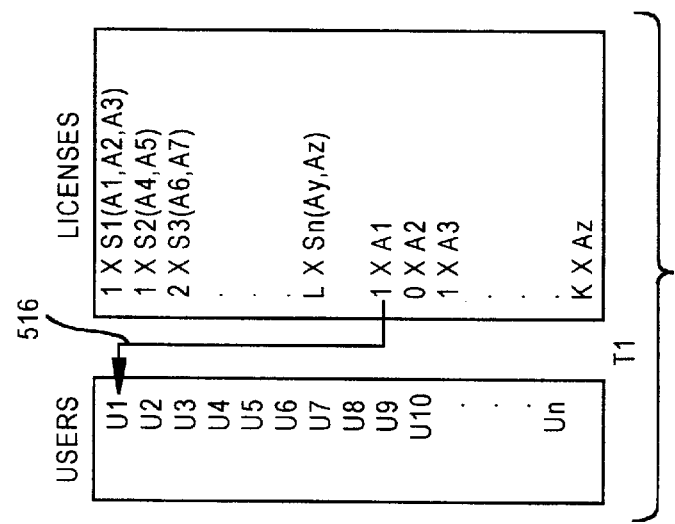

FIGS. 5A–5C depict one of the license assignment scenarios according to an embodiment of the present invention. In FIGS. 5A–5C, n users can be connected to a server 114 via a network. The network contains a number of applications A1 through Az. Each application has one or more individual or suite licenses available. In the example depicted in FIGS. 5A–5C, the available licenses and the order and nature of application requests are the same as in FIGS. 2A–2C. Thus, at time T1, user U1 requests launch of application A1 and in response, the network license system of this invention assigns the A1 license to U1 (e.g. by making an appropriate entry in a database, such as that depicted schematically in FIG. 4B), indicated by the arrows 516 in FIG. 5A and the system generates a signal to launch the requested program. In one embodiment, the analysis is performed in a distributed manner, with each network client performing part of the analysis task (e.g. to analyze all applications requested at that client station), coordinating the analysis, as needed, with other clients on the network, e.g. by reading and writing data to a database (e.g. that depicted in FIGS. 4A and 4B) which may reside, e.g., on the network server.

Figure 3:
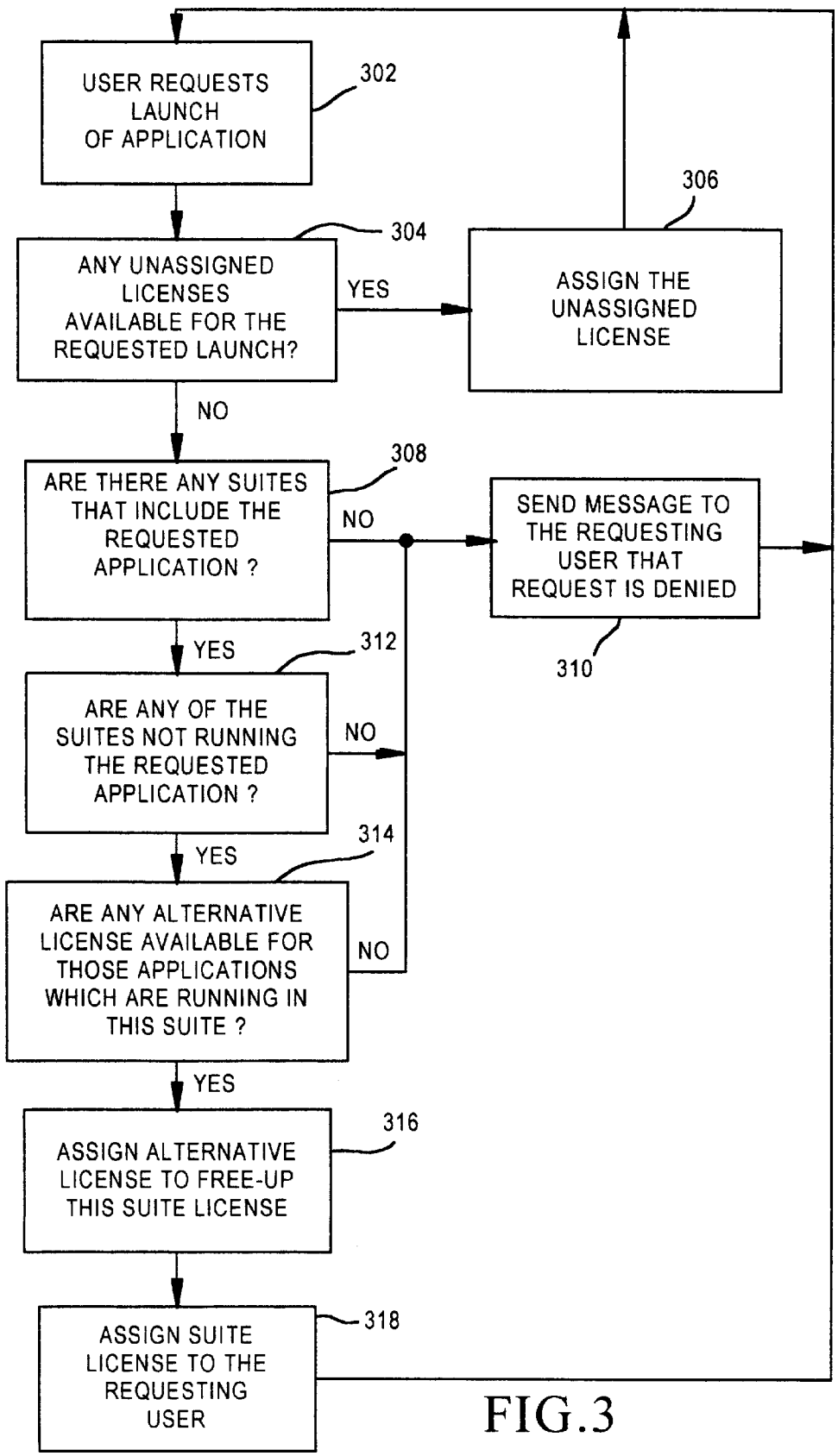
FIG. 3 is a flow chart depicting license analysis according to an embodiment of the present invention.

At time T2, user U2 requests launch of application A2 and the S1 license is assigned to U2, as depicted in FIG. 5B and A2 is launched. At time T3, user U1 requests application A1. The scenario up to this point has been identical with that for FIGS. 2A–2B. However, unlike the example of FIGS. 2A–2B, the present invention permits the launch of application A1. According to one embodiment of the present invention, U1's request for A1 can be accommodated using the method depicted in FIG. 3. As depicted in FIG. 3, the analysis procedure begins when a user requests launch of an application 302. At this point, the system determines if there are any unassigned licenses available for the requested application 304. In one embodiment, this is done by maintaining a database containing entries for each of the application licenses available and the assigned/unassigned status for each license (e.g. as depicted in FIGS. 4A and 4B). FIG. 4 depicts schematically, a database of a type which can be used in connection with the method of FIG. 3. A number of types of databases can be used for this purpose as will be apparent to those of skid in the art. The depiction of FIGS. 4A and 4B is provided for purposes of illustration and does not necessarily depict the most efficient manner of storing the information in the database. In the depiction of FIG. 4A, one record (represented in the figure by a single line of the table) is provided for each license. Thus, two records are provided for suite S3 since there are two licenses for S3. Each record contains a number of fields including the name of the suite (if any), the license number (to be used when more than one license is available), the names of the applications and an identification of the users who are using the various applications. Only one user can appear on any one line of the database, although the user may appear more once on a line. FIG. 4A depicts the situation which is in existence at the time of FIG. 5B.

If, upon checking the database, the system determines that an unassigned license is available for the requested launch, the unassigned license is assigned to the user 306, generally as depicted in FIGS. 5A–5B. However, if no unassigned licenses are currently available, (such as when user U1 requests application A1 following the situation in FIG. 5B) the system consults the database to determine if there are any suites that include the requested application. If there are no suites containing the requested application, it is clear that the only licenses available for the requested application are individual licenses and all of these individual licenses are being used. Accordingly, the system will send a message to the user that his request is being denied 310. However, if there is at least one suite that includes the requested application, the database is consulted to determine whether any of the suites containing the requested application are not currently running that requested application In the present example depicted in FIGS. 5A–5C, the system will recognize that there is at least one suite (namely suite S1) which contains the requested application A1 but which is not currently "running" application A1. Specifically, the license for S1, which was granted to user U2, was for use of application A1 and thus the license for A2 which is contained in U2's suite license to S1 is "wasted", i.e. is not being used. According to the method depicted in FIG. 3, it is determined whether there are any alternative licenses available for those applications that are running (i.e. for the "non-wasted" licenses) in suites which contain the requested application (in this case, suite S1 which contains the requested application A2). The first S1 license (to user U2) was a license for application A1. The only other license available for application A1 is the single license 516. This license is already assigned to user U1. According to the depicted embodiment of the invention, an alternative license assignment is made by switching the license of single application A1 from the current assignment (i.e. the assignment to user U1 516) to an assignment to user U2, depicted in FIG. 5C by the arrow 520, e.g. by making appropriate adjustment to the database, as depicted in FIG. 4B 520. There is now a license available for application A2 namely the license for suite S1. This license is now assigned to the new user U1 522 as depicted in FIG. 5C, with appropriate adjustments to the database being made as depicted in FIG. 4B.

While the method depicted in FIG. 3 is able to provide licenses in some situations in which access would be denied according to some previous methods, there still remain certain problems with the method of FIG. 3. First, there is no guarantee that the method of FIG. 3 will provide 100% efficiency, i.e., that it will always grant a license when one can be made available by judicious license "swapping". For example, it may be that step 314 of the method will return a negative result but that a license is nevertheless available, for example, by making two or more successive license swaps. The method of FIG. 3 could be revised to identify at least some of these situations by providing a nested method in which, if item 314 returns a negative result, a similar method is conducted for the non-requested applications in the suites (e.g., applications A1 and A2 in the case of suite S1) since in some configurations it may be possible to swap licenses for applications A1 and A2 in such a manner that alternative licenses for A1 and/or A2 become available by such a swapping, thus permitting the "freeing up" of an S1 license.

Another difficulty with the method of FIG. 3 is that it can require a substantial amount of computation and, accordingly, a substantial amount of time to complete the method, particularly in complicated cases which contain numerous overlapping suites and multiple users. The difficulty is even more serious when the "nested" approach described above is attempted.

Accordingly, although the method of FIG. 3 provides some benefits and is useful in some situations, another embodiment of the invention is provided which reduces or eliminates some of the deficiencies noted for the method of FIG. 3.

Figures 1, 6A:
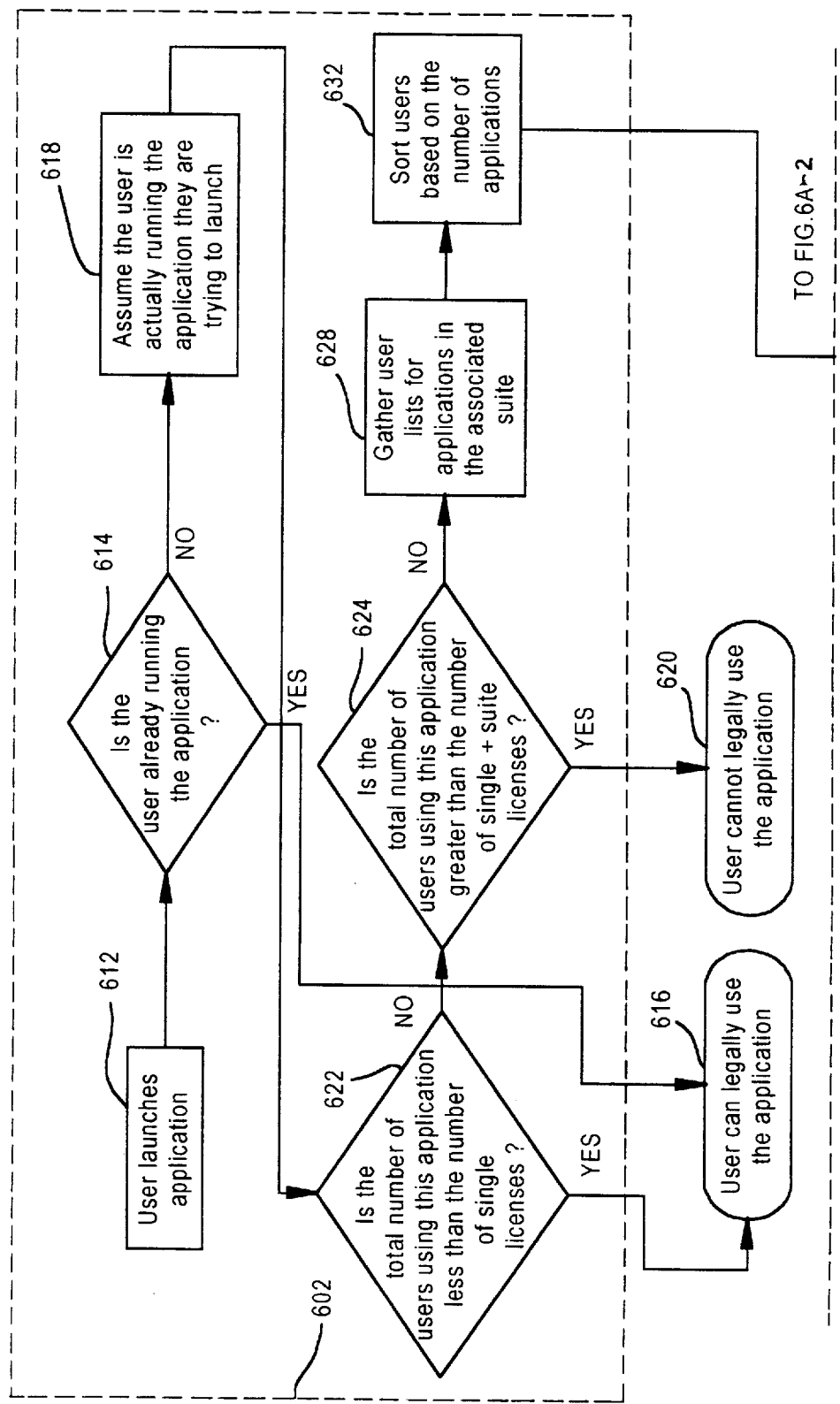
FIGS. 6A and 6B are flow charts depicting license analysis according to an embodiment of the present invention.
Figures 2, 6A:
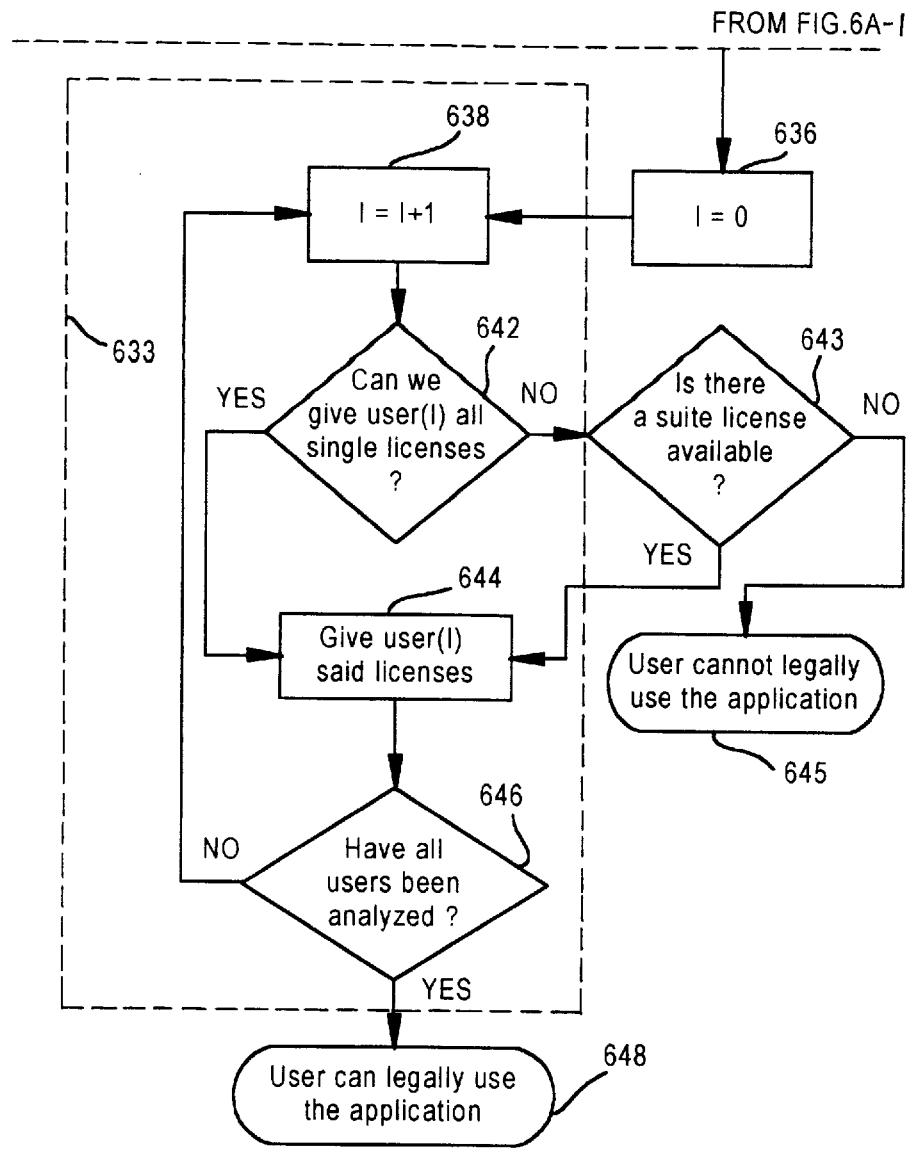
Figure 19:
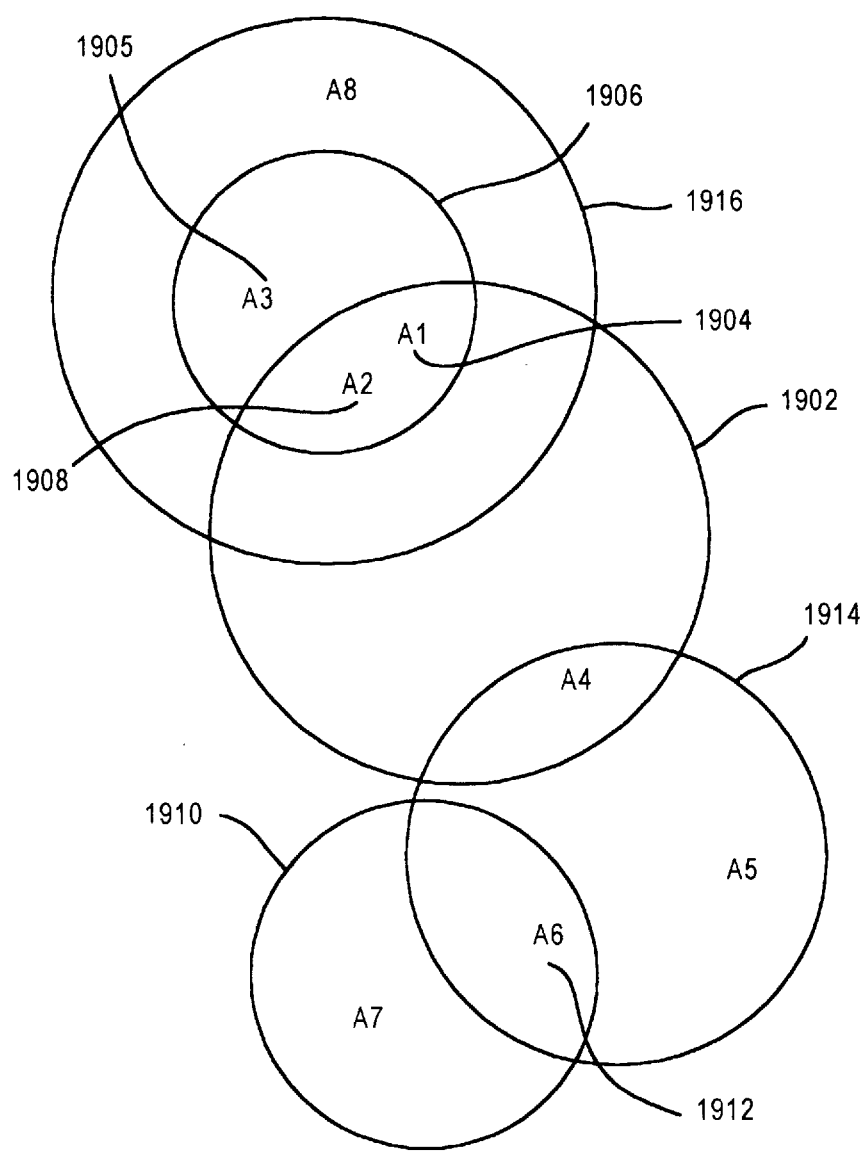
FIG. 19 depicts an example of overlapping suites of applications.

FIG. 6A is a flow chart of a license compliance apparatus, according to another embodiment of the present invention. FIG. 6A is directed to the situation in which there are licenses for both single applications and suites of applications and in which there are no pairs of suites in which one suite is a superset of another. For purposes of discussion, this situation can be referred to as "simple suites." One important feature of the embodiment of FIG. 6A (and at least some of the embodiments discussed below) is the order in which analysis is done. In this embodiment, the order of analysis is independent of the order in which users have made requests for applications. Instead, the order of analysis is an order selected for avoiding denial of licenses when a license is actually available. In this embodiment, at least some users are considered in ascending order of the number of requested or running applications which are members of one or more suites. This can be implemented by starting with a list of some or all users who are running or have requested an application (or, more precisely, a list of user identifier numbers) and sorting the list in ascending order of the number of suite applications they are running or have requested (ie. the number of applications which are members of one of the suites, regardless of whether the user was "assigned" a suite license or a single license during previous analyses). The identification of which user must be considered is more difficult when the suites can be related as a set and superset (e.g. 1906 and 1916, in FIG. 19) or complex suites (e.g. 1902 and 1914 in FIG. 19). License analysis for these cases will be discussed below. When fewer than all users are considered, preferably all users are considered that fit the criteria of running an application belonging to a suite, 1902, FIG. 19, which contains the requested application 1904 or an application 1905 in a suite 1906 which contains an application 1908 which is also a member of a suite 1902 that contains the requested application (an "overlapping" suite) or a suite 1910 which contains an application 1912 in common with an overlapping suite 1914. The user being considered will include at least the requesting user and all users currently using the requested application. In this context, "currently using" does not mean the user must be inputting information such as by a keyboard or mouse but only that one user could use the program at will (without the need to first launch the program). A minimized or iconized program (e.g. in a windows environment is being currently used. Thus, although it is possible to use a method in which all users are considered each time a request for a new application launch is made, in some embodiments, fewer than all users can be considered, in particular, only those users in an "analysis pool" which includes those users who are running applications that may be involved in the decision about whether the requested launch should be permitted. This reduces the time and resource requirements for implementing the present invention.

Figure 10:
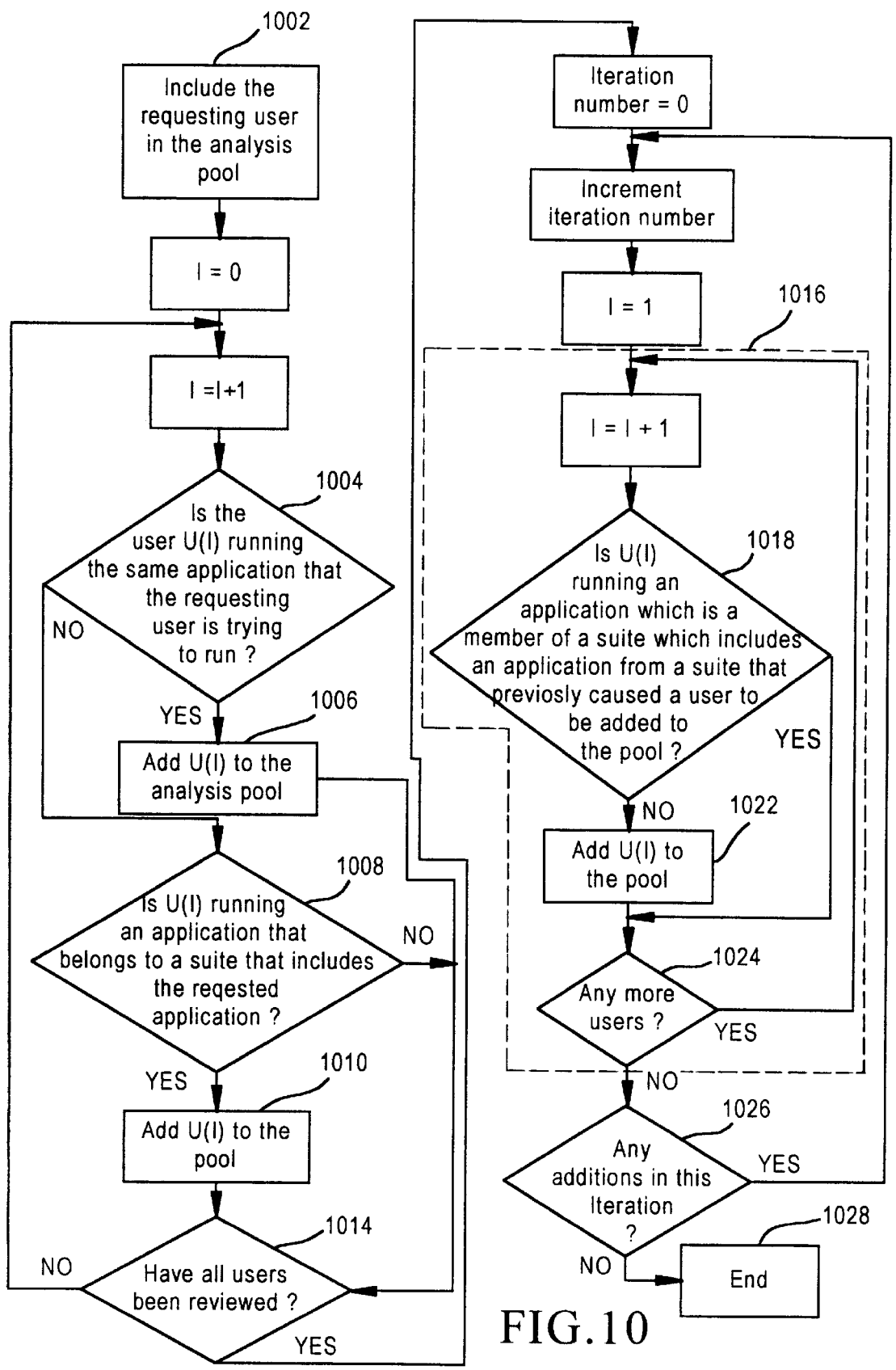
FIG. 10 depicts a process for determining the users in an analysis pool, according to an embodiment of the present invention.
Figure 11A:
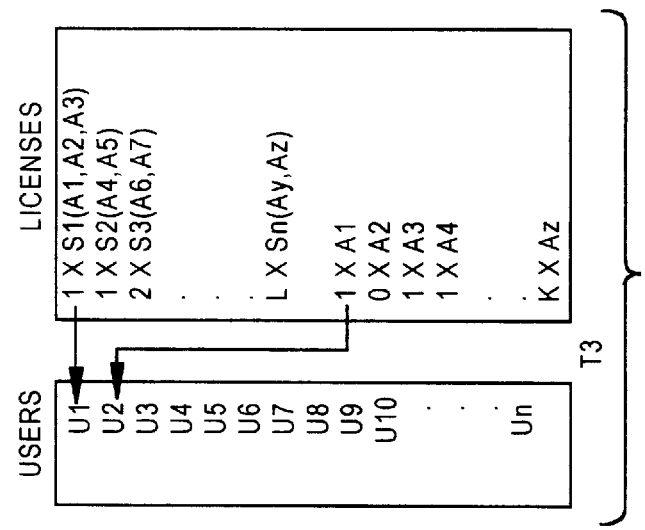
FIGS. 11A–11F depict an analysis of users and licenses according to an embodiment of the present invention.
Figure 11B:
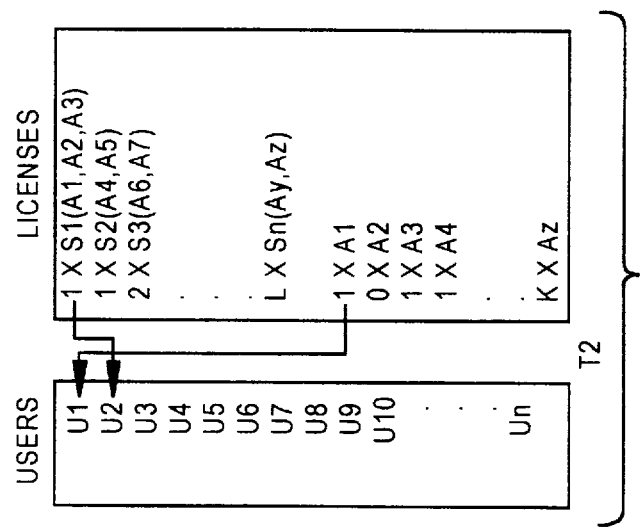
Figure 11C:
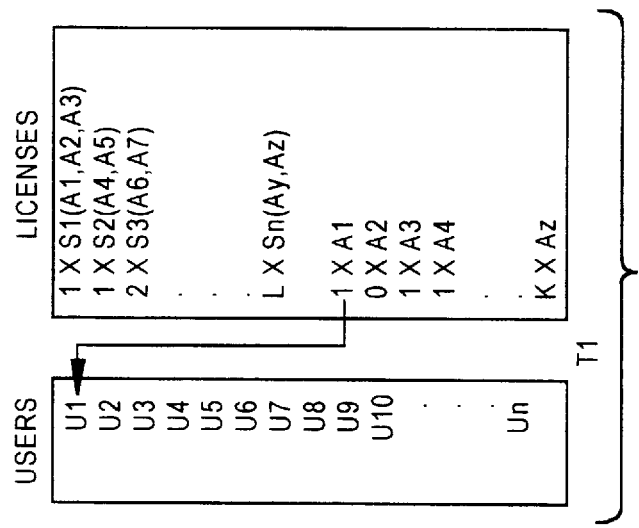
Figure 11F:
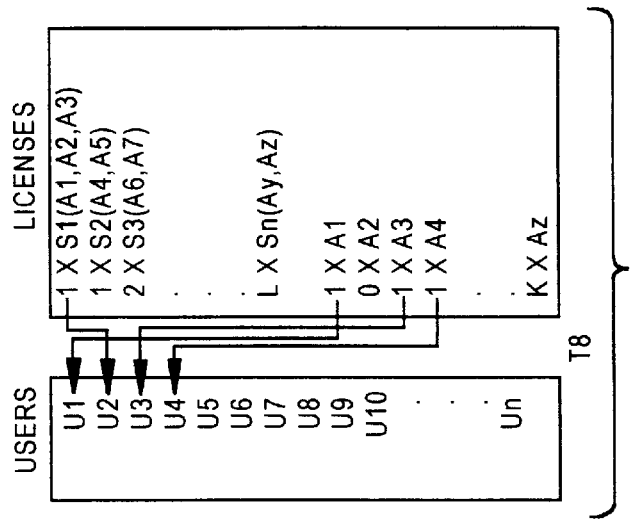
Figure 11E:
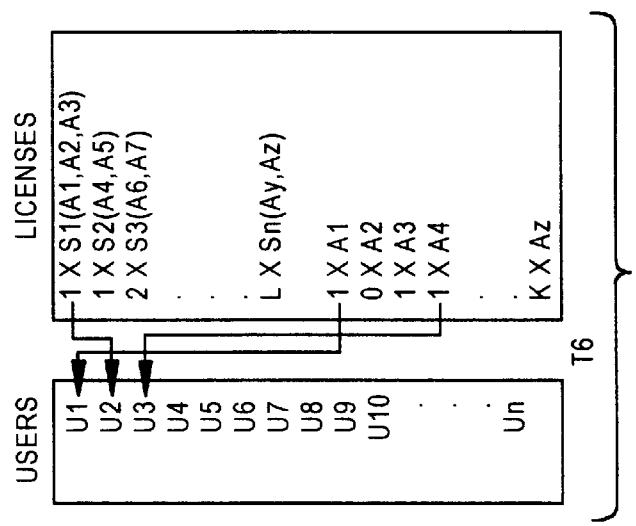
Figure 11D:
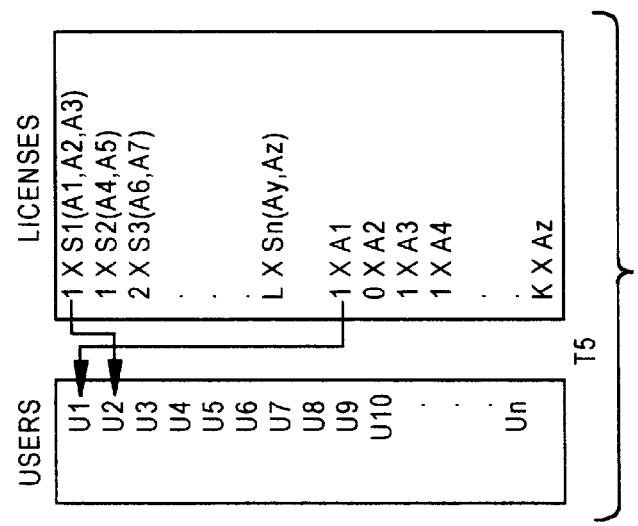

FIG. 10 shows one method which can be used for identifying the users in the analysis pool. According to the method of FIG. 10, the analysis pool will always include the user who has requested the application 1002. For each user, it is then determined whether that user is running the same application that the requesting user has requested 1004. If so, that user is added to the analysis pool 1006. For each of the users, it is also determined whether that user is running a suite which includes the requested application (whether or not the requested application is actually being run as a member of that suite) 1008. If so, the user is added to the analysis pool 1010. Otherwise, the routine returns to consider the next user 1012 or, if all users had been reviewed in this loop 1014, a second portion of method is initiated. The second portion of the analysis includes a loop through one of the users 1016, which may be repeated one or more times. In the loop 1016, it is determined for each user, whether that user is running an application which is a member of a suite, which includes an application from a suite which also has the requested application as a member or which includes an application which caused a user to be placed into the analysis pool during a previous iteration 1018. If so, the user is added to the analysis pool 1022. This analysis is repeated until all users have been analyzed 1024. After all the users have been analyzed within the loop 1016, it is determined 1026 whether any users were added during loop 1016. If any users were added, another iteration of loop 1016 is performed, again analyzing all users to determine whether they should be placed in the analysis pool, according to criterion 1018. When all users have been analyzed in an iteration of the loop 1016 without any new users being added to the analysis pool, the method is finished 1028.

Referring to FIG. 6A, this embodiment of the invention starts when a user requests the launch of an application 612. It is possible that the user requests the launch of an application which the user is already running 614, and in this case, the system outputs an indication that the user can legally use the application 616. Otherwise, the system "assumes", for purpose of the analysis, that the user is actually running the requested application 618. This is done by, e.g. forming a list (the "running users" list) which includes all currently running applications, plus the requested application. Preferably, the free availability or clear unavailability of the requested application is checked (so that the more time-consuming analysis following these checks can be avoided if not needed). Free availability is checked by determining if the total number of users using the application (including the requested use) is less than the number of single licenses available for that application 622. If so, the system outputs authorization 616, as described above. Otherwise, the system checks whether the number of users using the application (including the requested use) is greater than the total number of licenses available, including both single and suite licenses 624. If so, the system outputs an indication that the user who requested the launch can not, at the present time, legally use the application 626.

If neither free access nor clear unavailability has been determined, the system makes a list of, for each user in the "running users" list how many applications the user is running (including the requested application) which are applications that are members of one or more suites 628. As described above, this list is then sorted by user identifier in ascending order of the number of running or requested suite applications for that user, to provide another list (the "first sorted list") 632. The users are then considered in order of the first sorted list and assigned licenses, e.g. by using an index "I" 636, 638. A list of all the available licenses is made (the "license pool") which, at the beginning of the assignment process, will be all licenses, since no assignments have been made yet. In the first loop through the assignment procedure 633, the first user in the first sorted list, U(1) (i.e. the user with the fewest number of running or requested suite applications) is considered to determine if all of the user's needs (i.e. all of the applications which the user is running, including the requested application if U(1) is the user who made the request) can be filled by single licenses in the license pool (i.e. without using any suite licenses) 642. The user's needs are considered "filled" if there are licenses available in the license pool (i.e. which have not already been otherwise assigned) for all of the user's needs. If so, the single licenses are assigned to the user 644, and these licenses are deleted from the license pool. If all of the users in the sorted list have now been analyzed 646, all users in the sorted list have had their needs fulfilled and the system outputs a message indicating that the requesting user can legally use the application 648. If there are still users in the user pool who have not yet been considered, the routine returns to the beginning of the assignment procedure 634 and increments the index 638 in order to consider the next user in the sorted list.

Returning to block 643, if it is determined that there are not sufficient single licenses available to fill all the user's needs, the system then determines if there is a suite license which is in the license pool and which fills all the user's needs 643. If not, it is known that there is no scenario under which the requested application can be launched, consistent with both the currently running applications and the available licenses 645, and a signal indicating this result is output. If there is such a suite, the suite license is assigned to the user and deleted from the license pool 644.

If all users have been analyzed 646 without reaching a "not available" conclusion 645, it is known that there is a scenario under which all the currently running applications, as well as the requested application, can be licensed 648, and the system outputs a signal to initiate launch of the requested application. The system will update the database depicted in FIG. 4 to indicate which applications are being run by which users. However, as noted above, there is no need to store, after step 633, any indication of which licenses are assigned to which users. The license assignments depicted in FIG. 4 are only needed during the execution of the method of FIG. 6A and do not need to be "permanently" stored. If it is desired to maintain a record of license assignments (e.g., for verification, statistical analysis, providing recommendations of licensing needs and the like) the data can be stored if desired.

FIGS. 11A through 11F provide an example of the use of the method depicted in FIG. 6A. FIGS. 11A through 11F, relate to the situation in which there are several suite licenses (S1, S2, S3 . . . SN), and several individual licenses (A1, A3, A4, Az). However, none of the suite licenses overlap (i.e., there are no applications which are members of two different suites which are different from one another). In the example depicted in FIGS. 11A through 11F, at time T1, user U1, requests application A1. There is a single license available, so U1 is allowed to launch A1. The time T2, U2 requests A1. The users are sorted in the order U1, U2. U1 is given the single A1 license, and U2 is given the suite license S1 since there are no single licenses available, employing the methodology of FIG. 6A.

At time T3, U1 requests application A2. The users are sorted in the order: U2, U1. U2 is given the single A1 license, and U1 is given the suite S1 license. At time T4, U1 exits application A2. At this time, both U1 and U2 are running application A1. At time T5, U2 requests application A2. The users are sorted in the order: U1, U2. U1 is given the single A1 license, and U2 is given the suite S1 license. At time T6, U3 requests A4 and is given the single A4 license. At time T7, U1 requests A2. The users are sorted in order: U1, U2. U1 is given the suite S1 license, because there are not enough single licenses to fulfill U1's license needs. However, now there are not enough single or suite licenses to fill U2's license needs. Therefore, U1 is not allowed to launch A2. At time T8, U3 requests application A3. The users are sorted in the order: U1, U3, U2. U1 is given the single A1 license, U2 is given the suite S1 license, and U3 is given a single A3 license. In making this allocation, it was not necessary to consider the allocation of an A4 license.

In summary, according to one embodiment, the system is configured to deal with simple suites. To analyze these situations, users are sorted in ascending order based on the number of suite applications they are currently running. The users are considered in order, and their license needs are satisfied with single licenses, if possible, and, if not, a suite license is given, if possible. If neither of these is possible for any user, then no legal license is available, and the original user is not allowed to launch the requested application.

Figures 1, 6B:
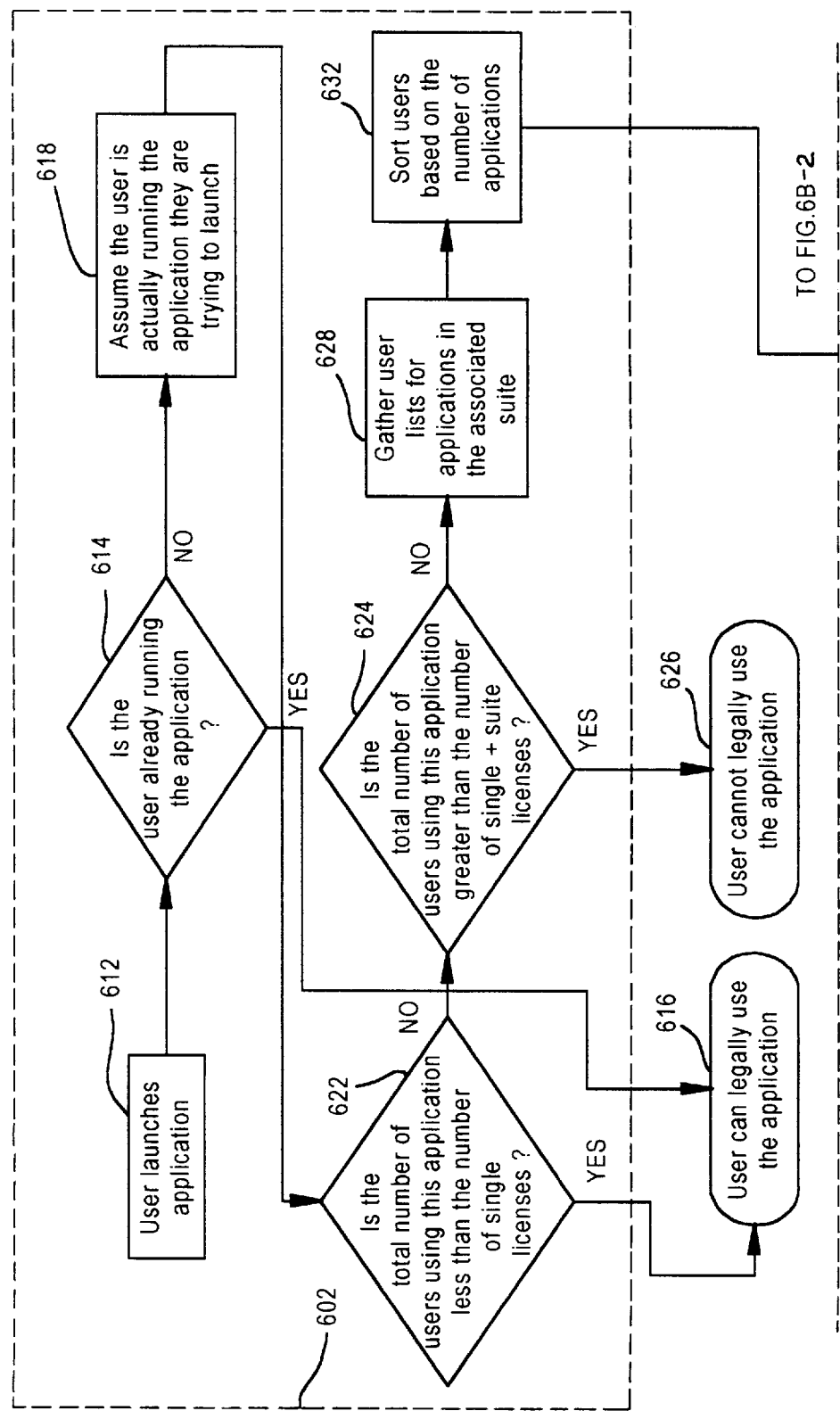
Figures 2, 6B:
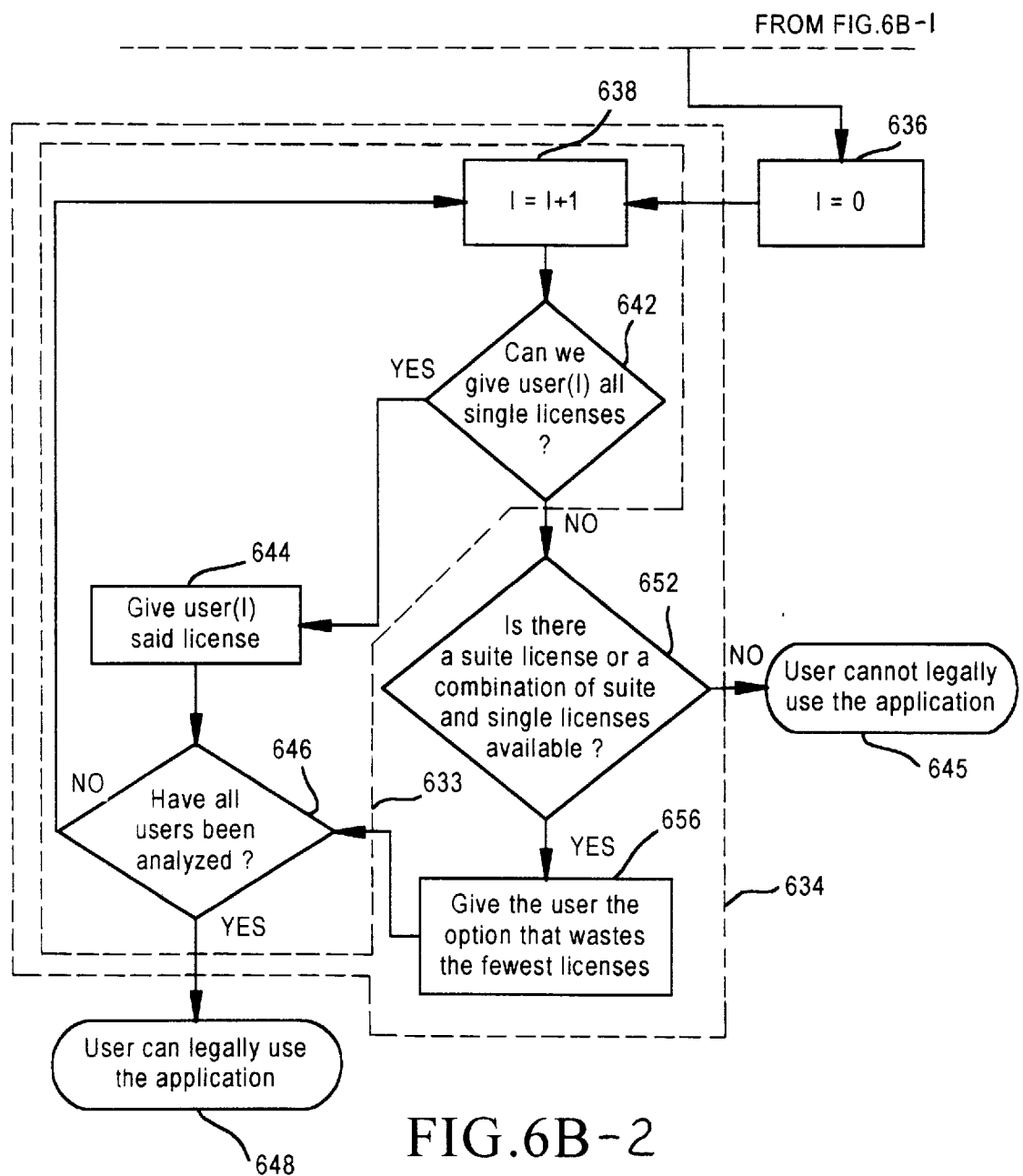

FIG. 6B is directed to the situation in which there are licenses for both single applications and suites of applications and in which there is at least one pair of suites in which one suite is a superset of another. For purposes of discussion, this situation can be referred to as "superset suites."

Particularly in the context of superset suites, an important feature of the embodiment of FIG. 6B is assigning licenses so as to minimize the number of wasted licenses. If a suite license is assigned to a user and that user is running fewer than all applications in the suite, each application not being run by the user is considered a wasted license. An application is considered "running" if it has been launched and has not yet been exited, regardless of whether it is performing any useful function (e.g. an application that, in a Windows system, has been minimized to an icon, is still "running").

As can be seen from a comparison of FIGS. 6A and 6B, the depicted methods are identical in blocks 602 and 633 and thus these items will not be discussed further. In the embodiment of FIG. 6B, if it is determined that there are not sufficient single licenses available to fill all the user's needs, the system then determines if there is a suite license, or a combination of a suite licenses with one or more single licenses which are in the license pool and which fill all the user's needs 652. If so, such a combination of licenses is assigned to the user and deleted from the license pool. If there is more than one combination which is available to fill the user's needs, the system avoids wasting licenses, e.g. so that the combination assigned to the user wastes fewer licenses than at least one combination identified in step 652 which was not assigned to the user. Preferably, when more than one combination is available, the system assigned that combination which wastes the fewest licenses 656.

If all users have been analyzed 646 without reaching a "not available" conclusion 645, it is known that there is a scenario under which all the currently running applications, as well as the requested application, can be licensed and the system sends a signal to initiate launch of the requested application. The system will update the database depicted in FIG. 4 to indicate which applications are being run by which users as described above for FIG. 6A.

Figure 7C:
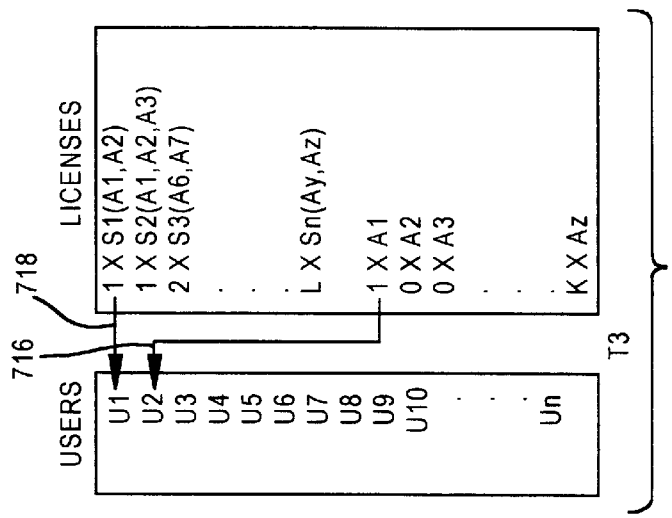
Figure 7B:
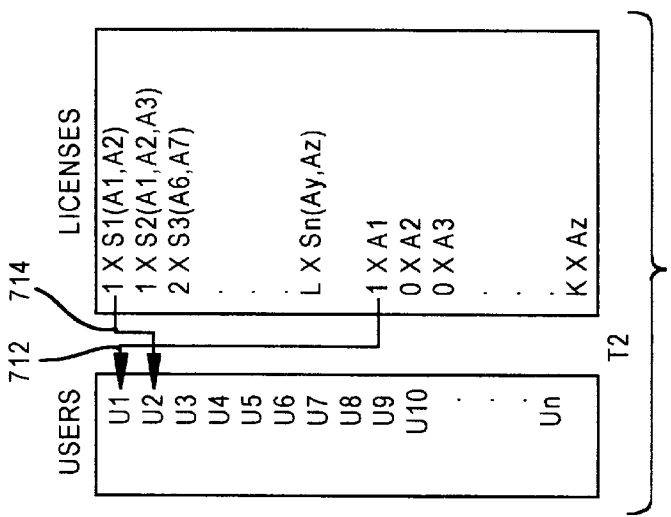
Figure 7A:
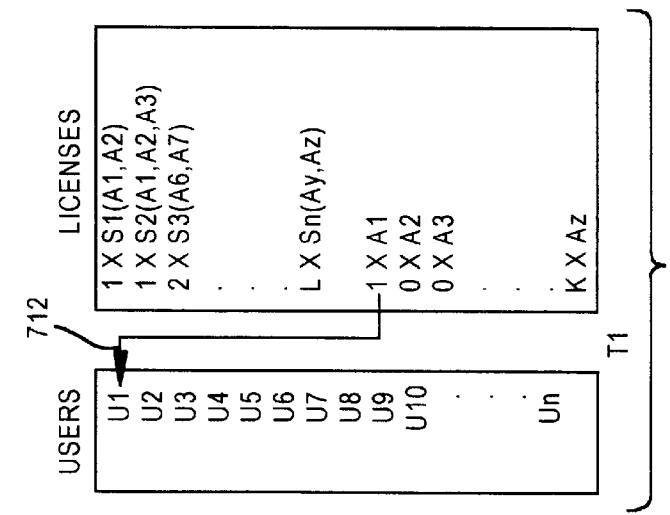

FIGS. 7A–7E provides an example of the use of the method of FIG. 6B. In the example of FIG. 7, the initial requests are the same as those discussed for FIGS. 2A–2C. However, the results are superior. In this example, at time T1, user U1 requests launch of application A1. There is a single license available 622 so U1 is allowed to launch A1 (712, FIG. 7A). Although FIG. 7A depicts a line connecting U1 with "1×A1", it is noted that if free availability of single licenses is determined 622, there is no need to make a particular association of a license with a user, although this can be done, if desired.

At time T2, U2 requests launch of A1. There are now more requests for A1 than there are single licenses available, so the assignment process 634 starts. The users are sorted in order of the number of suite applications launched or requested. both U1 and U2 are running or have requested a single suite application, A1 (A1 is a suite application since it is a member of at least one suite—in fact it is a member of two suites: S1 and S2). Since U1 and U2 are equal in the number of running suite applications, the order of analysis, as between them, is unimportant, and will be taken as: U1, U2. Using the process of FIG. 6B, U1 is assigned 712 the Single A1 license 644. In the next loop of process 634, U2 is assigned 714 the suite license S1 656, since there are now no single licenses available in the license pool, with confidence that the assignments have been made within the bounds of the available licenses 648.

At time T3 (FIG. 7C) U1 requests launch of A2. The users are now sorted in the order: U2, U1. U2 is given the single A1 license 716 and U1 is given the suite license S1 718.

At time T4 (FIG. 7D), U3 requests launch of A1. The users are sorted in the following order: U2, U3, U1. U2 is given the single A1 license 722, U3 is given the S1 suite license 724 and U1 is given the S2 suite license 726.

At time T5 (FIG. 7E), U2 requests launch of A3. The users are sorted as follows: U3, U2, U1. U3 is given the single A1 license 728, U2 is given the suite license S2 732 and U1 is given the suite license S1 734.

In summary, the system depicted in FIG. 6B is configured to deal with superset suites. Users are sorted as in FIG. 6A and again considered in order. Users' license needs are satisfied with single licenses, if possible. If not, they are given a suite or a combination of suite and single licenses, whichever option wastes the least number of application licenses. When a user is given a suite license but is not currently using all the applications in the suite, the user is considered to be wasting a license for each application the user is not running from the suite. If none of the options are possible for any user, then no legal license is available.

Although a database as depicted in FIG. 4 can be used to store information about license assignments even after completion of the assignment procedure 634, it is noted that, in the method of FIGS. 6A and 6B, the "assignment" is only temporary in the sense that, following completion of the assignment procedure 634, there is no need to store which applications are assigned to which users (since the method begins each analysis with the "assumption" that no licenses have yet been assigned, i.e., with a database from which all license assignments have been blanked out or deleted). Thus in the database depicted in FIG. 4, the columns "licenses assigned to" will be blank at the beginning of the assignment procedure 634, although preferably the system does retain information regarding which suites and applications are available and which users are using which applications.

Figures 1, 8A:
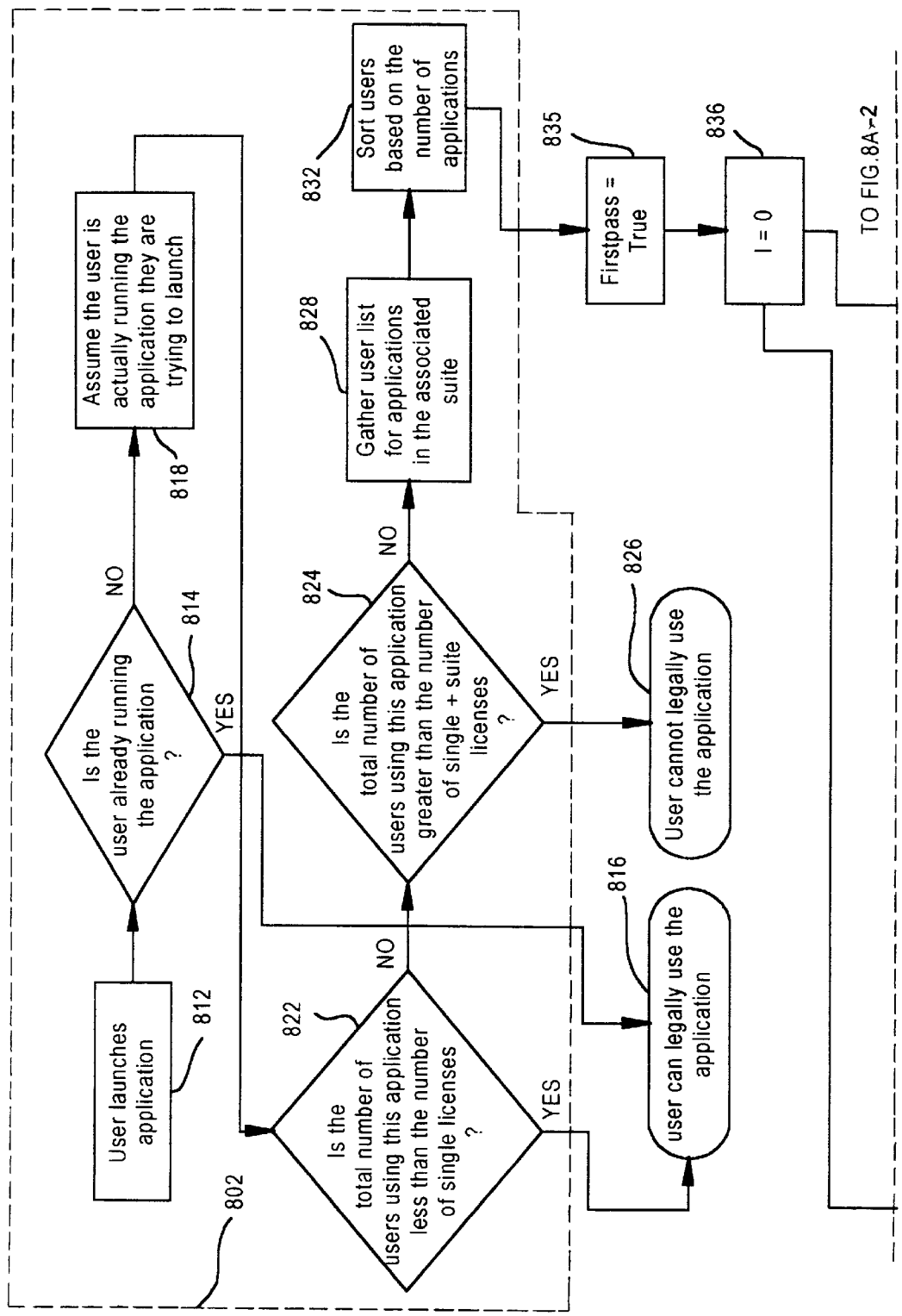
FIGS. 8A and 8B are a flow chart depicting license analysis according to an embodiment of the present invention.
Figures 2, 8A:
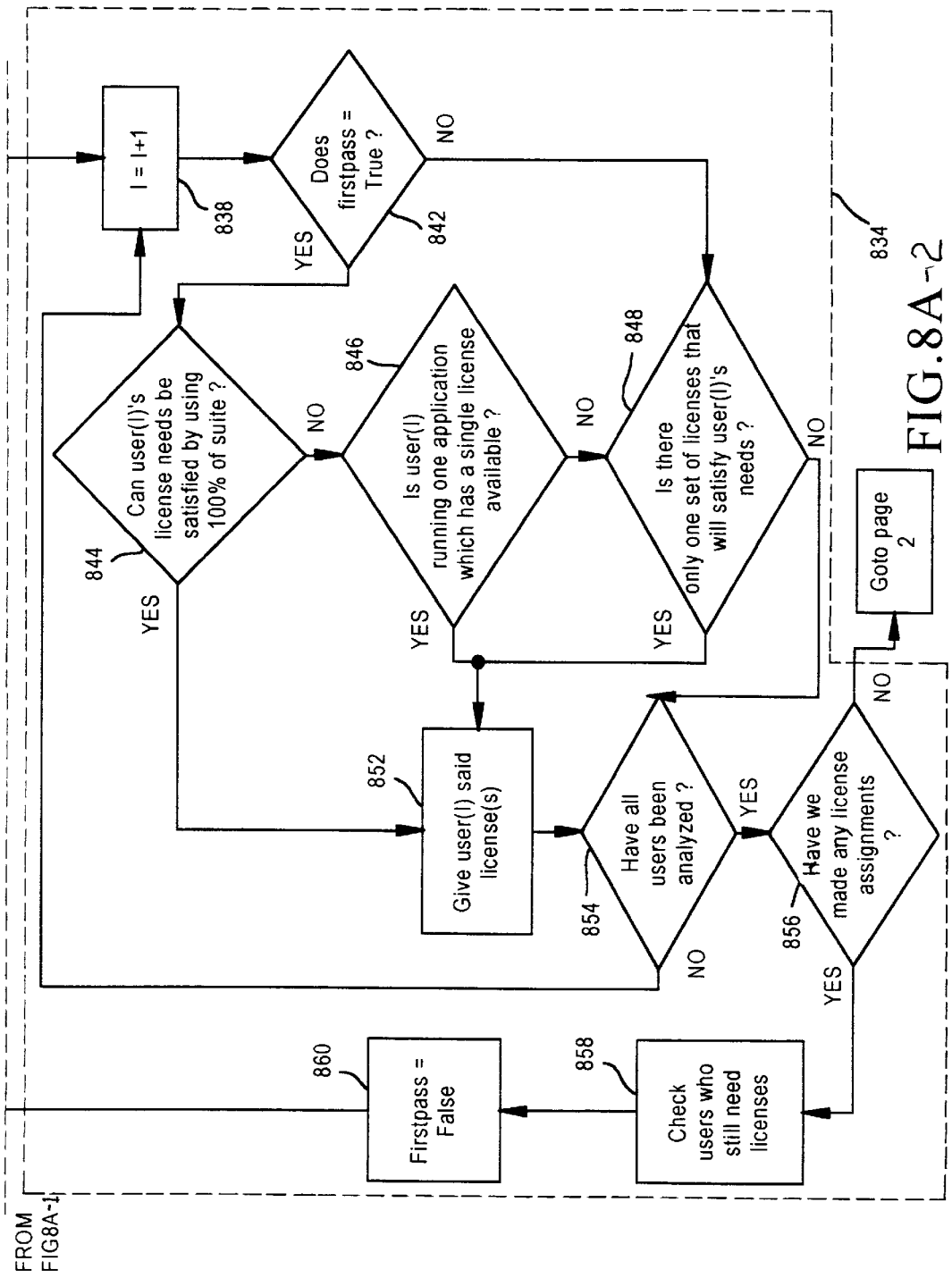
Figure 8B:
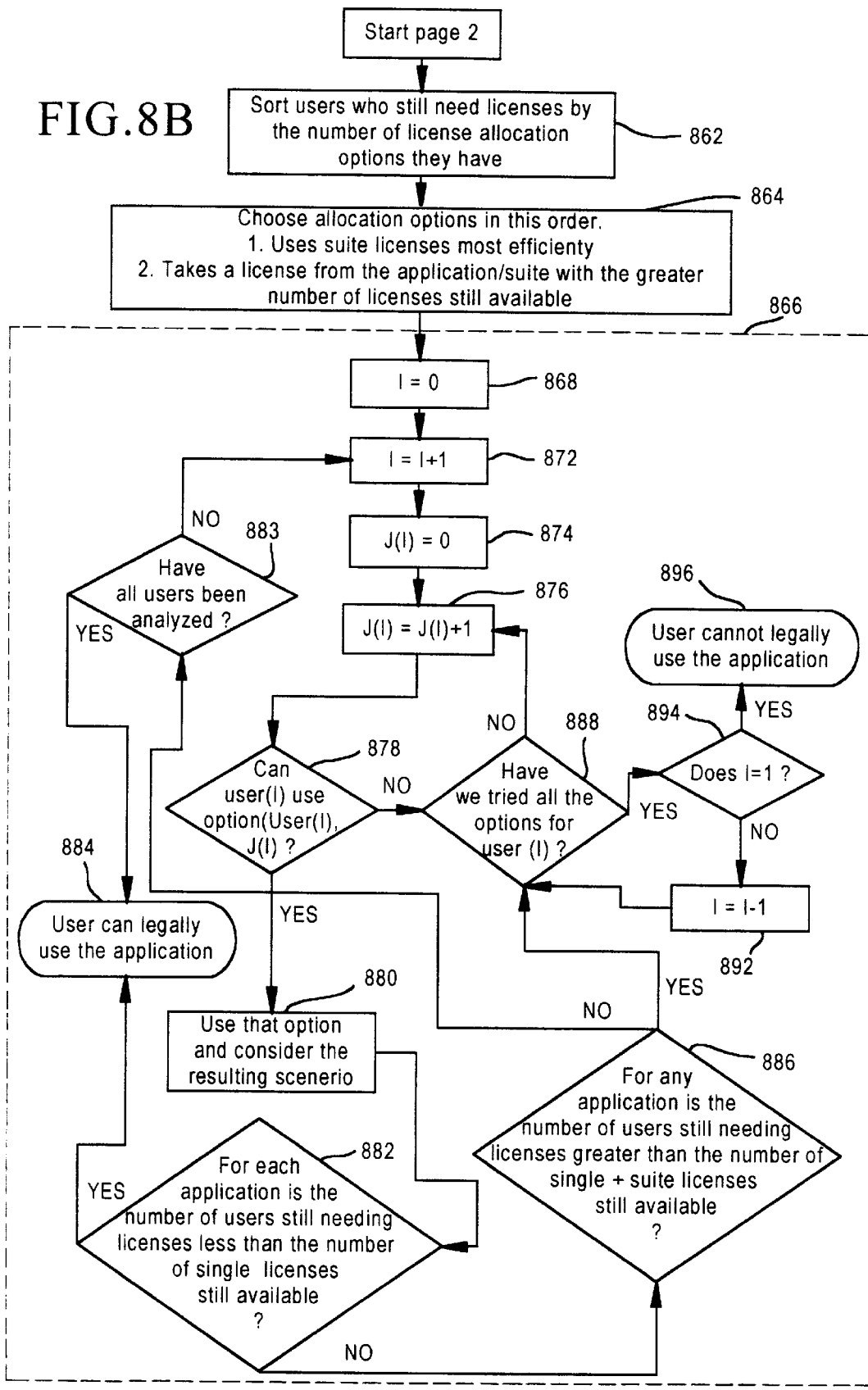

While the method depicted in FIGS. 6A and 6B are able to provide licenses in some situations in which access would be otherwise denied, there still remain certain situations that are preferably addressed by a somewhat different method. FIG. 8 depicts an method according to another embodiment of the present invention. The method of FIG. 8 is believed to be particularly useful when there are at least two suites which overlap but are not in the relationship of a set and superset (i.e., in which there are at least two suites which have at least one program in common and in which each of these two suites has at least one program which is not contained in the other suite).

Before describing the details of the method of FIG. 8 some of the important features of the method of FIG. 8 will be discussed. While the method of FIG. 6B was used in the context of suites that may be in a superset relationship, the method of FIG. 8 places no restrictions on the number or type of suites in which an application may be included and places no restrictions on how the suites must relate to each other (particularly, no requirement that overlapping suites must be in a set-superset relation). In general, the method of FIG. 8 is provided in two parts. In the first part, certain cases are taken care of which are relatively easy to deal with, such as cases where all of a user's needs can be met by a single suite license (with no wasted licenses) or by one single license or by a plurality of available suite licenses (with no wasted licenses), or cases in which only one license combination is available for the user's needs. Once this part of the procedure is completed, the only remaining unlicensed users (if any) will be those who have more that one option available for filing their needs. The second part of the process addresses the needs of this group of users. If it happens that there are only a few possible scenarios (e.g. only one or a few users that have multiple options, or if only two or a few options are available to those users in the remaining list), the rest of the analysis can be done by "brute force", (i.e. by trying all the various possible scenarios until it is determined that there is one that will fill all the remaining users needs). However, the brute force method is impractical for situations where there are a large number of remaining users and/or a large number of options for all or many of the remaining users. In this situation, a more directed approach, such as a tree-search approach, described below, is preferred. An analysis which is conducted in tree fashion involves analysis according to an ordered list, in this case an ordered list of users, in which the steps in the analysis progress from at least partial analysis of a given user to at least partial analysis of the next user in the ordered list. In one embodiment, the analysis is a depth-first analysis, e.g. as described below, in which, as soon as a good scenario is found for a given user (i.e. a scenario user which is the user's licensing needs are met) analysis of the next user in the ordered list is begun, without the need for seeking other possible good scenarios for the given user, at least until it is determined that the good scenario is inconsistent with assigning licenses to other users lower on the ordered list.

The method depicted in FIG. 8 is initiated when a user requests the launch of an application 812. The steps 812–832 of the initial portion 802 of the process are the same as the corresponding steps 612–632 of the initial portion 602 of the process of FIG. 6, and will thus not be discussed further, here. After step 832, there will be a first sorted list of users, sorted in order of the number of running or requested suite applications.

Next, the process makes a first pass through a first assignment procedure 834, looping through this procedure multiple times in the first pass, one loop for each user in the first sorted list. A flag 835 is set to keep track of whether this is the first pass through the procedure 834. As in the method of FIG. 6, an index "I" 836, 838 is used to keep track of which user is being considered during the current loop of the procedure 834. The procedure 834 is somewhat different in the first pass, and the procedure consults the flag 842 to determine if this is the first pass. If it is the first pass, the user is assigned licenses 852 (e.g. by making appropriate entries in the database of FIG. 4) if (a) all the user's needs can be met by using one [or more] suites with no waste (ie. so that all applications in the suites licensed to the user would be run by the user 844 or (b) the user is running only one application and a single license is available for that user 846 or (c) there is only one set of licenses in the license pool that will satisfy the user's needs 848. An example of a situation in which only one set of licenses will satisfy a users needs is a situation in which the user has requested an application for which there is a single suite license available, and no other licenses are available. In this situation, the user must have the single suite license in order to run the application.

After a user has been considered (i.e. has either been assigned a license 852 or has not qualified under 844, 846 or 848), the process will loop through the next user in the sorted list by incrementing the I counter 838 or, if all users have been considered 854, the system will determine if any license assignments have been made during this pass 856. If license assignments have been made during this pass, another pass through the assignment procedure 834 after reducing the sorted list to include only those users who have unfilled needs, setting the "first pass" flag to "false" 860 and setting the index I to zero 836. The making of an assignment triggers an additional pass through the procedure 834 since it is possible that a user who, during the most recent pass, did not have only one set of licenses that could fill his needs 848, will now have such a unique license need since the license pool was made smaller by the assignments which were made during the most recent pass. Subsequent passes through the procedure 834 are identical to the first pass, except that there is no need, in subsequent passes, to check items 844 or 846, and thus, only item 848 is checked in subsequent passes.

If, at the end of a pass, it is determined that no license assignments were made during that pass 856, the method proceeds to the second part, analyzing those users who have more than one option for licensing available. In this part the remaining users (i.e. users who still have unmet needs after completion of the multi-pass assignment procedure 834) are placed in a list and sorted in ascending order of the number of license options available to them 862 to provide a "second sorted list."

Preferably, as each user is considered in a tree-like fashion governed by the order of the second sorted list, the various options available to the user are considered in a preferred order. Options which use licenses most efficiently (ie. result in the fewest number of wasted licenses) are considered first. If there are two or more options for a user which have the same efficiency, the options that would result in assignment of a license from an application or suite that has the greatest number of licenses available will be considered before an option that has the same efficiency but has a fewer number of licenses still available. Since the order of options will be different for each user in the second sorted list, the process includes choosing the order of option consideration for each user 864 such as by choosing and storing the order for each user in a database.

In summary, the tree-type order of consideration is as follows. The first user in the second sorted list U(1) is assigned the first option in the ordered option list for the user, Option (user(1), J(1)) and the corresponding licenses are removed from the license pool. It is then determined if the needs of the next user in the second sorted list, U(2) can still be accommodated after the assignment of Option (user (1), J(1)) to user U(1). This can be done by trying the various scenarios for U(2), in order of preference: Option (user(2), J(1)), Option (user(2), J(2)) . . . Option (user(2), J(n)), until an option is found which is available and will meet U(2)'s needs. This option is assigned to U(2) and the assigned licenses are removed from the license pool. Next, the various options available for U(3) are tried in order: Option (user(3), J(1)), Option (user(3), J(2)) . . . Option (user(3), J(n)) to attempt to find an option that is still available (after the current assignments of options to U(1) and U(2)) that will fill U(3)'s needs. The process continues, adding assignments to users farther down on the second sorted list and removing those assignments from the license pool until either all users in the second sorted list are licensed (which means that the requesting user can be permitted to launch the requested application), or a user is found (U(N)) whose needs can not be met by any available license options. In the latter case, the system returns to the next previous user (U(N-1)) and unassigns the license assignments that had been made to U(N-1), returning them to the license pool. The system then determines if there are any options in U(N-1)'s option list that have not yet been considered and which are available in the license pool. If so, the assignment is made, the licenses deleted from the license pool and the next user, U(N), is considered again. If not, the system returns to the next previous user (U(N-2)), unassigns U(N-2)'s licenses and determines if there are any options in U(N-2)'s option list that have not been considered and that would meet U(N-2)'s needs. The system continues in this fashion until either all users in the second sorted list have been licensed or all possible license scenarios have been considered, without success.

Procedure 866 of FIG. 8 shows a manner of implementing this tree-type analysis. A first index I is used to keep track of which user in the second sorted list is being considered 868, 872. Each user I has a second index J(I) for keeping track of which of the options of user I is being considered 874, 876. The system begins with the first user in the sorted list (I=1) and considers the most preferred option for that user, Option (user(1), J(1)). After selection of a user and an option for consideration, the system determines whether that user can use that option (i.e. whether all licenses needs for that option are still in the license pool). If it is available, the assignment is made and the assigned licenses are deleted from the license pool 880. The process determines, for each application, whether the number of users still needing licenses is less than the number of single licenses available for that application 882. This is similar to item 822. If so, it is determined whether all users have been analyzed 883 and, if all users have been analyzed, it is known that all current users plus the requesting user can be accommodated by the available licenses, i.e. the requested launch can legally take place, and the system outputs a signal permitting launch of the requested application 884. If not, the method determines if there is any application for which the number of users still needing a license is greater than the total number of single and suite licenses still available for that application 886. If not, it is determined whether all users have been analyzed 883 and, if all users have been analyzed, the system outputs an indication that the requesting user can legally use the requested application and the requesting user is permitted to launch the requested application 884.

If it is determined that, for some application, the number of users still needing licenses is greater than the number of licenses available, this is an indication that the option under consideration can not work in the present scenario. Therefore, it is determined if there are other options available for this user 888 and, if so, J(I) is incremented 876 in order to consider the next option for user I. If all options for user I have been tried, the user number is decremented 892 (and the licenses previously assigned to the user I-1 are returned to the license pool), for consideration of any other untried options for user U(I-1) 888 provided the user under consideration is not the first user (I=1) 894. If the user under consideration is the first user, and all options for the first user have been tried without success, the system returns an indication 896 that the requesting user can not legally use the requested application, and the launch request is denied.

In the embodiment depicted in FIG. 8, the loop 866 considers, in order, all possible combinations of options for the various users in the second ordered list until either an option is found which accommodates all users or it is determined that there is a user who has no options which will accommodate his needs and is consistent with accommodating the needs of all other users. It may be possible to avoid checking all options for all users if it can be determined ahead of time that some of the branches or options cannot logically "work" so that the branches can be "pruned".

Figure 9C:
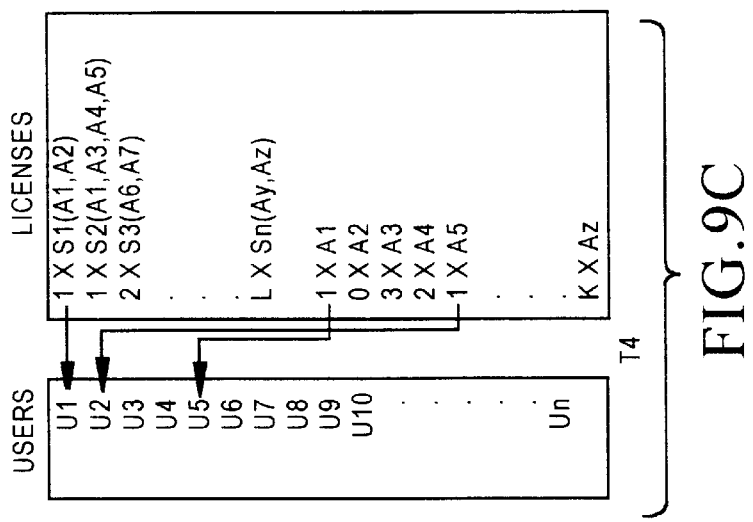
Figure 9B:
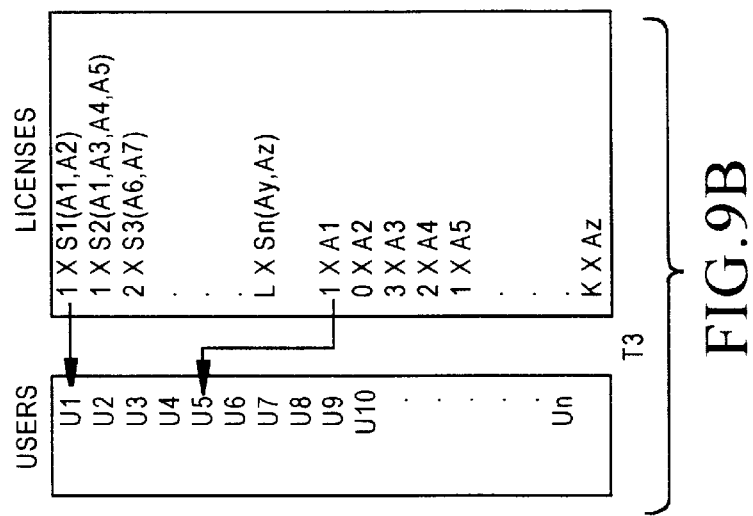
Figure 9A:
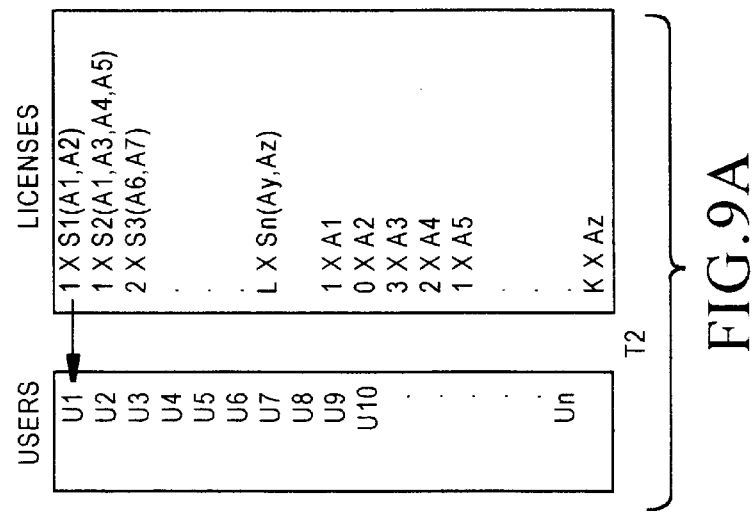
Figure 9F:
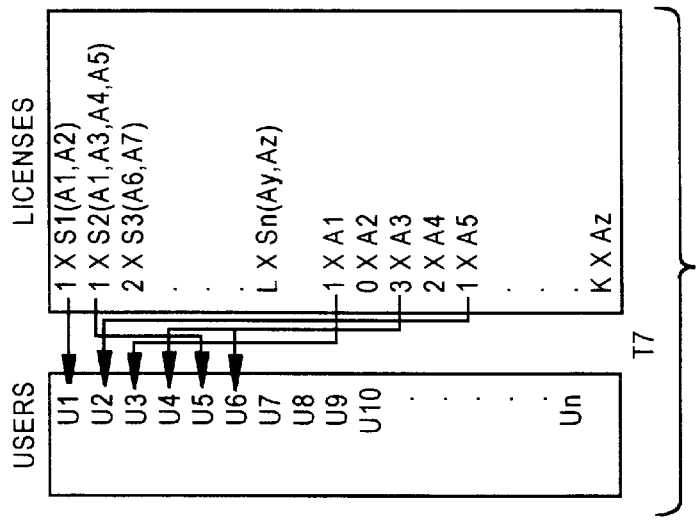
Figure 9E:
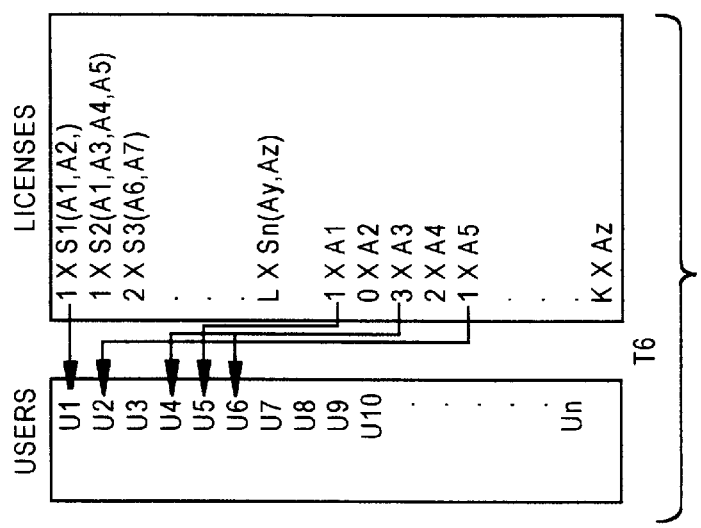
Figure 9D:
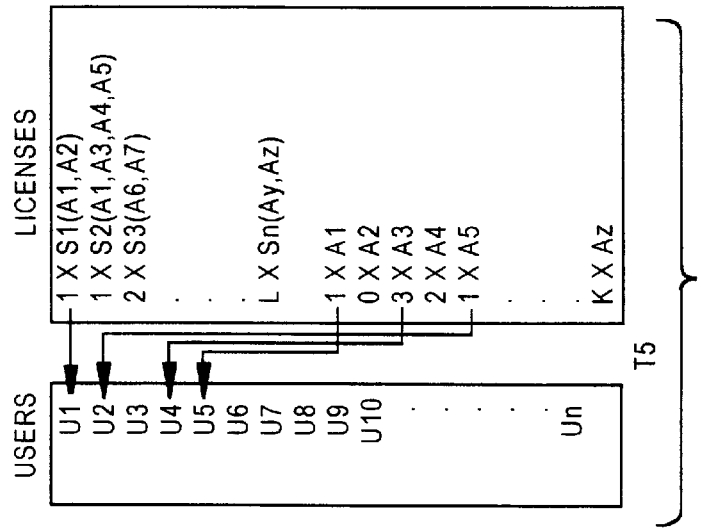
Figure 9H:
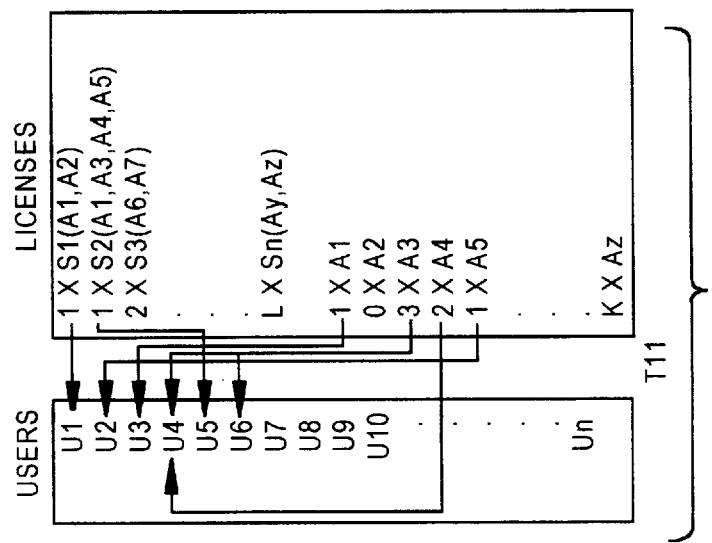
Figure 9G:
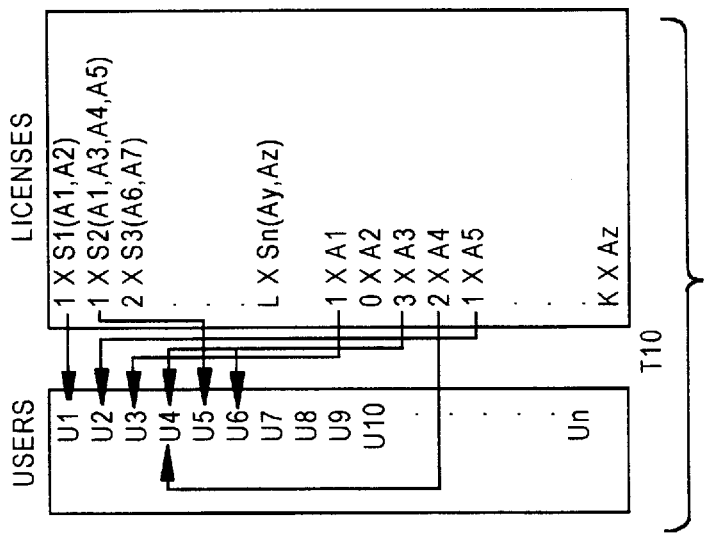

FIGS. 9A through 9J provide an example of the application of the method depicted in FIG. 8. As depicted in FIG. 9A, at time T1, (not shown) U1 requests application A1 and is given a single license. At time T2, depicted in FIG. 9A, U1 requests application A2 and is given a suite S1 license. At time T3 (FIG. 9B), U5 requests application A1 and is given a single A1 license, while U1 receives the suite S1 license. At time T4 (FIG. 9C), U2 requests application A5 and is given a single A5 license, while U5 is given a single A1 license, and U1 is given a suite S1 license.

At time T5 (FIG. 9D), U4 requests A3 and is given a single A3 license, while U5 is given a single A1 license, U2 is given a single A5 license, and U1 is given a suite S1 license.

At time T6 (FIG. 9E), U6 requests A3 and is given an A3 license. U5 is given a single A1 license, U2 is given a single A5 license, U4 is given a single A3 license, and U1 is given a suite S1 license.

At time T7 (FIG. 9F), U3 requests A1 and is given a single A1 license. U6 is given an A3 license, U2 is given a single A5 license, U4 is given a single A3 license, U5 is given a suite S2 license, and U1 is given a suite S1 license.

At time T8 (FIG. 9G), U4 requests A4. U3 is given a single A1 license, U6 is given an A3 license, U2 is given a single A5 license, U5 is given a suite S2 license, U1 is given a suite S1 license, and U4 is given a single A3 and A4 licenses.

At time T9 (FIG. 9H), U5 requests application A3. U3 is given a single A1 license, U6 is given an A3 license, U2 is given a single A5 license, U5 is given a suite S2 license, U1 is given a suite S1 license, and U4 is given single A3 and A4 licenses.

At time T10 (FIG. 9I), U6 requests application A4. U3 is given a single A1 license, U2 is given a single A5 license, U5 is given a suite S2 license, U6 is given a single A3 and A4 licenses, U1 is given a suite S1 license, and U4 is given single A3 and A4 licenses.

At time T11 (FIG. 9J), U3 launches A4. U2 is given a single A5 license, and U1 is given a suite S1 license. At this point, the remaining users have more than one option available. Users U3 through U6 are sorted in the order: U3, U4, U5, U6. Then, temporarily, U3 is given a single A1 and A4 licenses, U4 is given single A3 and A4 licenses, and U5 is forced to have a suite S2 license. This leaves U6 without any legal options available, so U5 gives back the suite S2 license and, since U5 has no other options available, U4 is forced to give back the single A3 and A4 licenses, and use the other option of the suite S2 license. However, now U5 has no legal options so U4 returns the suite S2 license, and U3 returns the single A1 and A4 licenses, and is given the suite S2 license. Now U4 is given the single A3 and A4 licenses, U5 is given the single A1 and A3 licenses, and U6 is given the single A3 and A4 licenses. Accordingly, since a scenario is available under which current and requesting users can run the applications under the available licenses, U3 is allowed to launch application A4.

In summary, one embodiment of the invention includes configuring the system to deal with complex suites. This places no restrictions on the number of suites in which an application may be included, and no restrictions on how suites must relate to each other. Users are sorted in ascending order, based on the number of suite applications they are currently running. A first pass is made through the list of sorted users, and if a user is running only one application for which a single license is available, then a license is given to that user. If the users needs can be fulfilled with a suite license and no licenses would be wasted in doing so, the suite license is assigned to the user. If there is only a single choice of licenses which the user can be given, this choice is given to the user. Repeated passes are made through the list of sorted users using these criteria, until such time as a pass is made through the list of users, during which no license assignments are made. This effectively will leave only those users which have more than one option available and who have license needs which have not yet been met. These users are re-sorted in ascending order, based on the number of options available to the user. The users are considered in this new order, and for each user being considered, that user's options are considered one at a time, giving preference to options with the following properties:

1) those options that waste the fewest licenses; and
2) those options that would take licenses from applications or suites, with the greatest number of licenses still available.

If a point is reached at which none of the user's options are valid (i.e., in which none of the options for the user currently being considered results in a scenario which allows the launch of the requested application by the requesting user), the system returns to a consideration of the preceding user (i.e., preceding in the second ordered list), returning the current user's licenses back into the license pool. The options for the preceding user are then considered and the process continues, as if there has been no previous consideration of the users later in the second sorted list, and any options that have not yet been considered are attempted, by making the license assignment on a "trial basis," to determine whether this trial license assignment is consistent with some scenario under which all users can have their needs legally met. If a point is reached in which the first user in the second sorted list has no more options available (i.e., all options have been tried and none have been found consistent with permitting the launch of the requested application by the requesting user), then no legal licenses are available for the requested application, which the requesting user tried to launch.

Regardless of which type of license management system may be used, the situation is likely to involve the ability of a user to request the launch of an application, and the license compliance system either permitting the launch or determining that the user's needs cannot currently be accommodated, using the available licenses.

In the latter case, several actions might be taken. In the simplest systems, the license compliance system can simply output a message which results in preventing the launch of the requested application, possibly with a message being transmitted to the user, informing the user of this action, and suggesting that the user try again later. In another system, the user whose request has been denied can be placed on a waiting list, either automatically or at the user's option. One difficulty of providing a waiting list is that it is difficult to configure a waiting list scheme which is fair to all users on the waiting list. In this context, fairness means that the requesting users are permitted to launch requested applications, as appropriate licenses become available (e.g. because another user closes an application), in a preferred order, and there is little or no departure from this order. In one embodiment, the preferred order is the order in which the requests were made. In this configuration, a waiting list is fair if a later-requesting user who was placed on the waiting list is never granted the ability to launch a requested application prior to another user who requested the same application before the later-requesting user. Of course, it may also be preferable to have a waiting list which is ordered in some fashion other than strict first-in-time order of preference (e.g., by giving preference to some users based on the likely importance of that user's access to the particular program, such as given priority to an accountant's request for a spreadsheet application versus a word processor's request for a spreadsheet application or, by the same token, giving preference to personnel in the word processing department's request for an word processor application over an accountant's request for a word processor application). For purposes of illustration, the following description will be in terms of the first-in-time preference system, with the understanding that it can be used with other preference systems as well.

In a time-preference system, to be fair, the waiting list should act like a queue, in which any user later in the waiting list cannot receive a license before someone earlier in the waiting list, except in cases where those in front of the queue cannot launch the application they are waiting for, but a user farther back in the queue could. In the latter situation, users in front of the queue should be given an opportunity at the application license before being skipped.

In order to prevent the user on the waiting list from "cutting ahead" of another user (i.e., from being permitted to launch an application prior to a higher-priority user on the waiting list who was waiting for the same application), the order the users are put onto the waiting list must always be considered (or, where different, the order in which the users initially requested launch of the application).

In one embodiment, users who are on the waiting list automatically check the database (typically, stored on the server) at periodic intervals known as the "heartbeat," to see if the database has changed and, if the user is on a waiting list, whether a free license is available.

This situation can result in a user later in the waiting list finding a free license before someone ahead of the user on the waiting list, since even when all users have the same heartbeat rate, the heartbeat will be "beating" at different times. For example, if the heartbeat rate is 5 minutes, user U1 may check the database at 5 minutes after the hour, 10 minutes after the hour, 15 minutes after the hour, etc., while user U2 may check the database at 6 minutes after the hour, 11 minutes after the hours, 16 minutes after the hour, etc.

Figure 12:
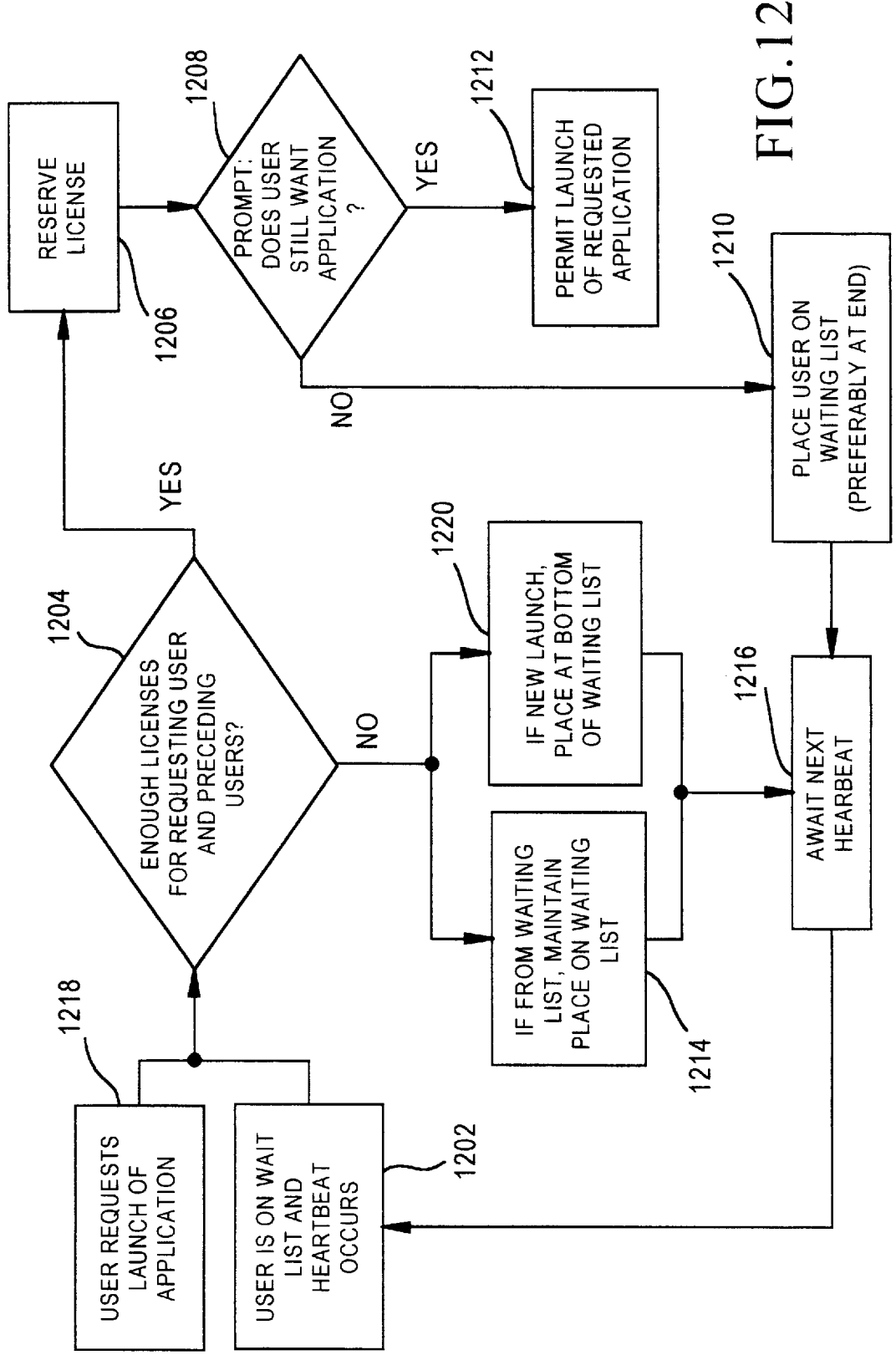
FIG. 12 depicts a waiting list process according to an embodiment of the present invention.

FIG. 12 depicts a procedure for checking the waiting list for those users who are already on the waiting list. The method begins when a heartbeat occurs for a user who is on the waiting list 1202. To make sure the first-in-first-out (FIFO) order of the waiting list is adhered to, a user can only take a free license if there are enough licenses for that user and everyone who is higher-priority on the waiting list 1204. If there are enough licenses, then the license is reserved and the user is prompted to provide an indication whether or not that user would still like to launch the application for which they are on the waiting list. If the prompt is ignored (e.g., because the user is away from his computer, or because the user chooses not to answer the prompt at that time), after an amount of time, preferably settable by the system administrator, the prompt is removed and the user is put back on the waiting list, preferably at the end of the waiting list. If the user responds to the prompt with an indication that the user still wishes to launch the application, the application is launched 1212.

Returning to decision 1204, if there are not enough licenses for the requesting user and/or preceding users, the user will remain on the waiting list in the same position 1214, and await the next heartbeat 1216 whereupon the process will repeat.

FIG. 12 also depicts the analysis procedure when a user requests launch of a new application 1218. In this situation, the procedure is the same as in the previous example, except that if there are not enough licenses for the requesting user and all preceding users, the user is placed at the bottom of the waiting list 1220, and then awaits the next heartbeat 1216.

Figure 13:
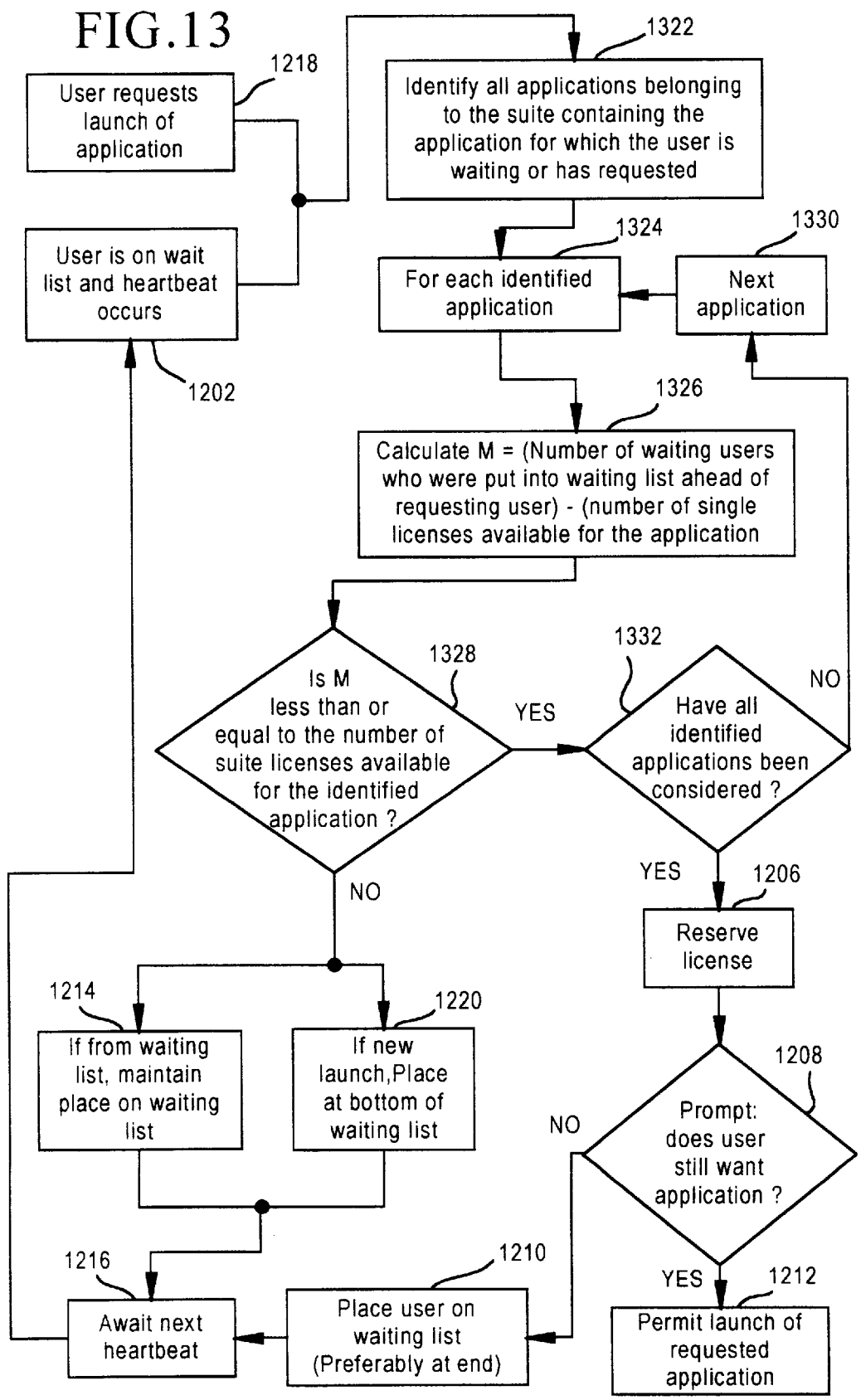
FIG. 13 depicts a waiting list process according to an embodiment of the present invention.

The procedure of FIG. 12 can be used in situations where the user has requested an application. FIG. 13 depicts the analysis which can be used if the application is part of a suite and the user is assigned a suite license. In that case, all of the applications belonging to that suite and all the users who are waiting for those applications must be considered 1322. For each identified application 1324 the number of single licenses is subtracted from the number of waiting users who were put onto the waiting list ahead of the current user 1326 (called "M" in this depiction). If the single licenses are not sufficient to satisfy all the needs of the waiting users plus the requesting user for this application (i.e, greater than zero), then it is determined whether M is less than or equal to the number of suite licenses available for the identified application (i.e., if there are not enough single licenses available then any available suite licenses are taken) 1328. If it has been found that there are sufficient single and suite licenses available for an identified application, the same analysis procedure 1326, 1328 is applied to the next application 1330 or, if all identified applications have been considered 1332, the license is reserved 1206 and subsequent steps similar to those depicted in FIG. 12 are taken 1208, 1212, 1210, 1216. If, on the other hand, for any of the identified applications it is found that there are not sufficient single licenses and suite licenses available for all users on the waiting list who are prior to the requesting user, plus for the requesting user, the user must either put himself at the end of the waiting list 1220 (i.e., the software automatically places the user at the end of the waiting list), or continue waiting 1214 and await the next heartbeat 1216.

Figure 14:
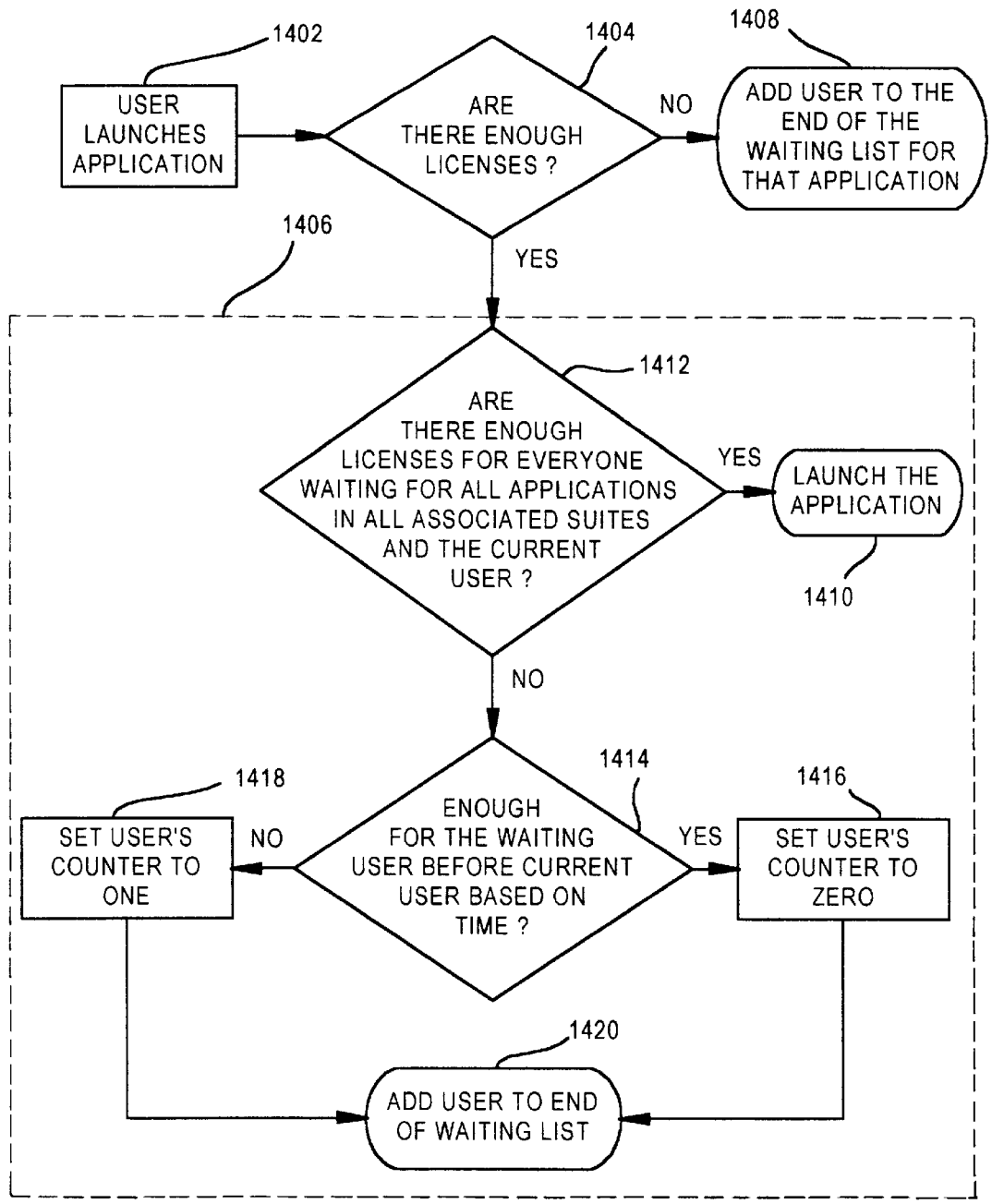
FIG. 14 depicts a waiting list process according to an embodiment of the present invention.

The method depicted in FIG. 13 can be used for simple suite situations. If the suites include a superset or complex suite situation, then the method depicted in FIGS. 14 and 15 can be used. (The method of FIGS. 14 and 15 can also be used for simple suite situations.) The method depicted in FIG. 14 depicts a situation when a user attempts to launch an application. If there are not enough legal licenses (indicated in procedure of FIG. 17 by the "Legal" flag being set to "False" 1730), the user is added to the end of the waiting list for that application 1408. If there are enough legal licenses (i.e., "Legal" is set to "True") 1404, then the users on the waiting list must be considered 1412. If there are enough licenses for all users on the waiting list and the current user, then the requesting user may launch the application 1410. If not, it is determined whether there are enough licenses for the individual user who is immediately before the requesting user on the waiting list 1414. If there are, the requesting user is added to the end of the waiting list 1420, and a counter associated with the requesting user is set to zero 1416. If there are not enough for the waiting user before the requesting user, the requesting user is placed on the end of the waiting list 1420, and the associated counter is set to one 1418. The use of the counter is described below.

Figure 15:
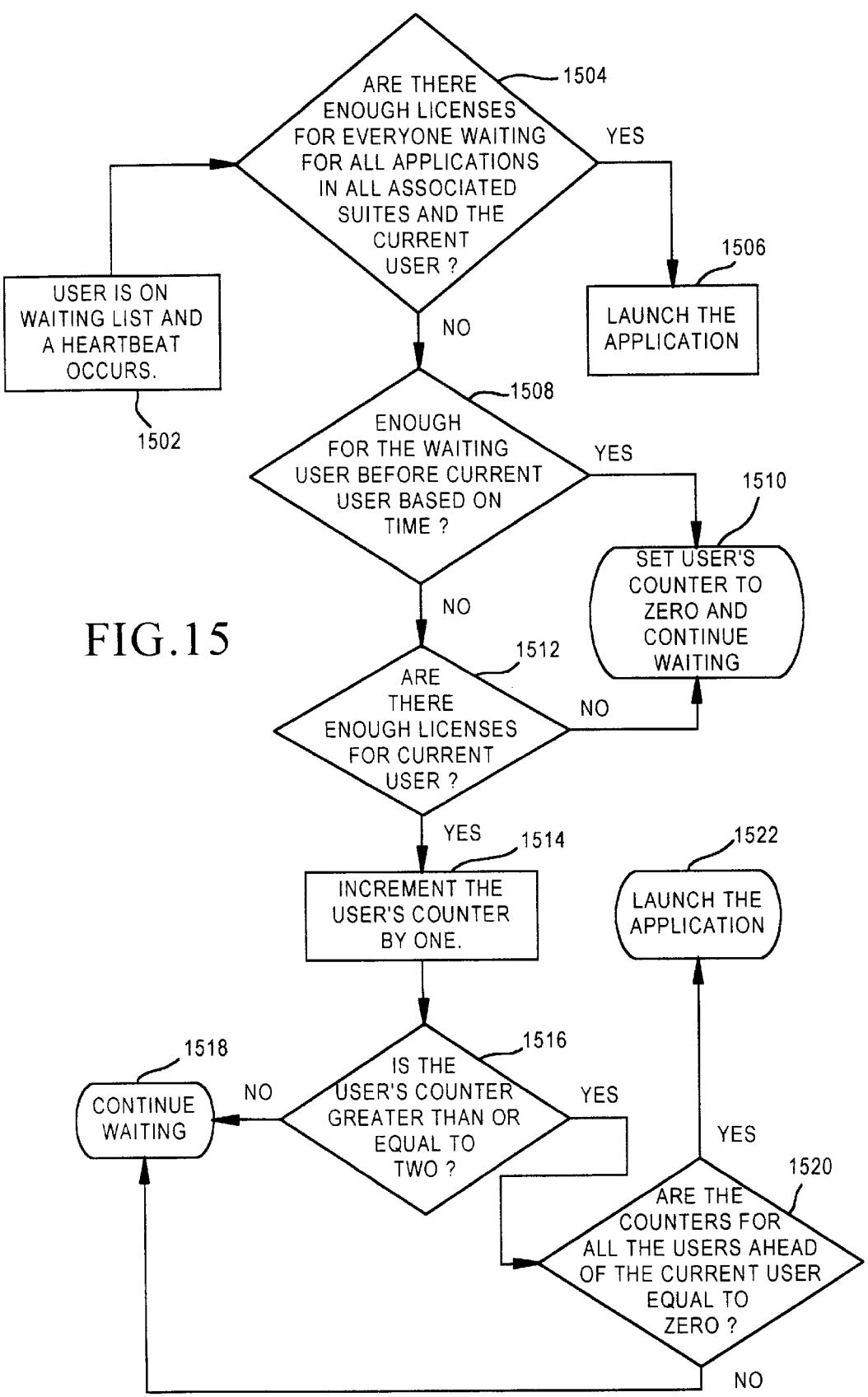
FIG. 15 depicts a waiting list process according to an embodiment of the present invention.

FIG. 15 depicts the situation in which the user is already on the waiting list and a heartbeat for that user occurs 1502. It is determined whether there are enough licenses for all users on the waiting lists, including the current user 1504. If there are, then the user may launch the application 1506. If not, it is determined whether there are enough licenses for the user who is immediately before the requesting user on the waiting list 1508. If there are enough licenses for the previous user on the list, then the requesting user's counter is set to zero, and the requesting user continues waiting 1510. If not, then it is determined whether there are enough licenses for the requesting user 1512. If not, the current user's counter is set to zero and the current user continues waiting 1510. If there are enough licenses for the requesting user, the requesting user's counter is incremented by one 1514. At this point, if the requesting user's counter is less than two 1516, the requesting user continues waiting 1518 (i.e., awaits the next heartbeat). If the current user's counter is greater than or equal to 2, then it is determined whether the counters for all users who are on the waiting list ahead of the current user are equal to zero 1520. If so, the requesting user may launch his application 1522. Otherwise, the requesting user continues to wait 1518.

Figure 16B:
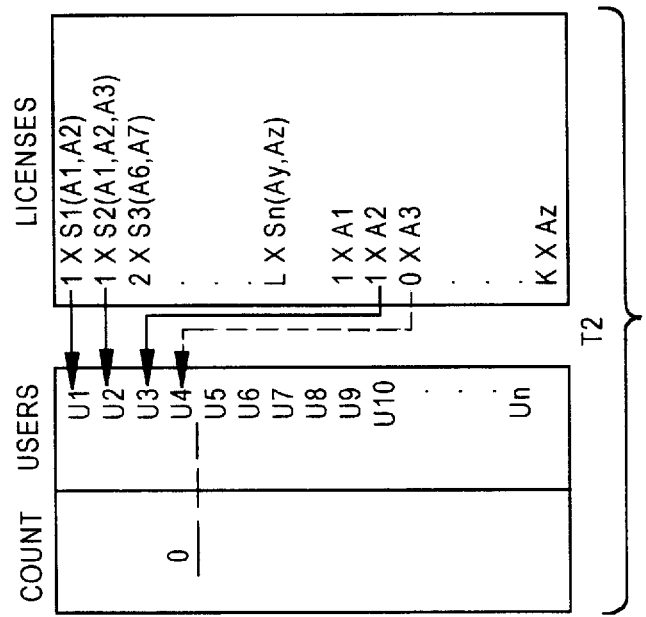
FIGS. 16A–16E depicts a license and user analysis and waiting list analysis according to an embodiment of the present invention.
Figure 16A:
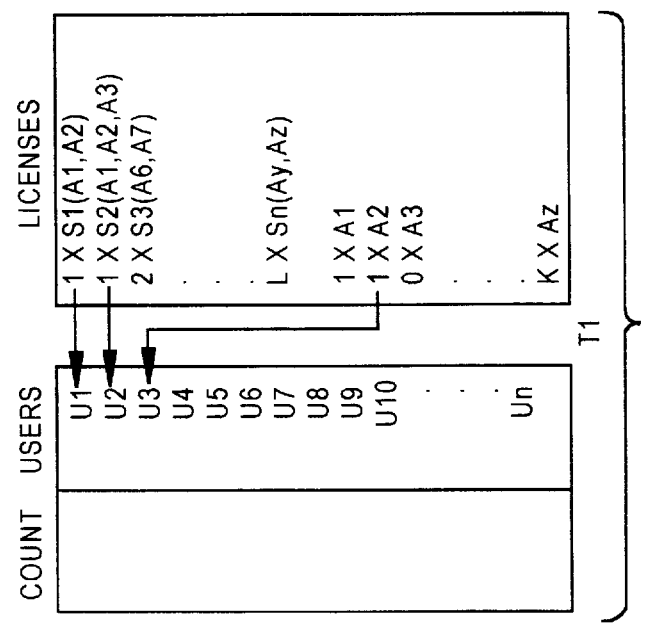
Figure 16D:
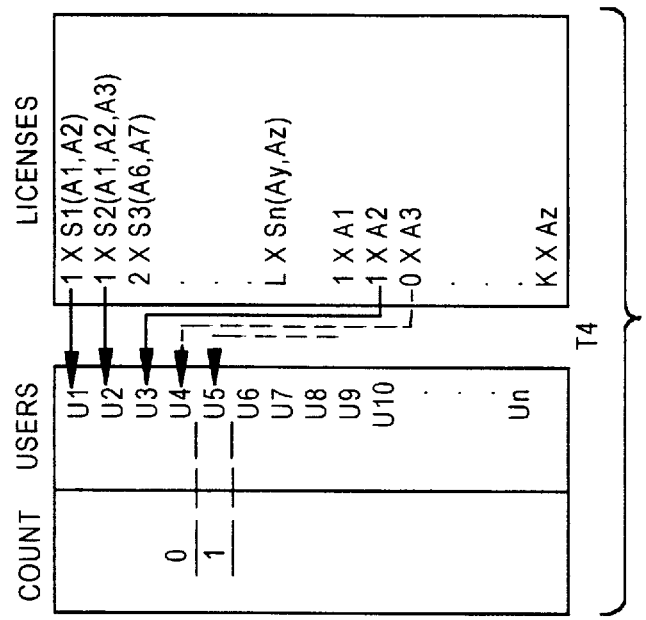
Figure 16C:
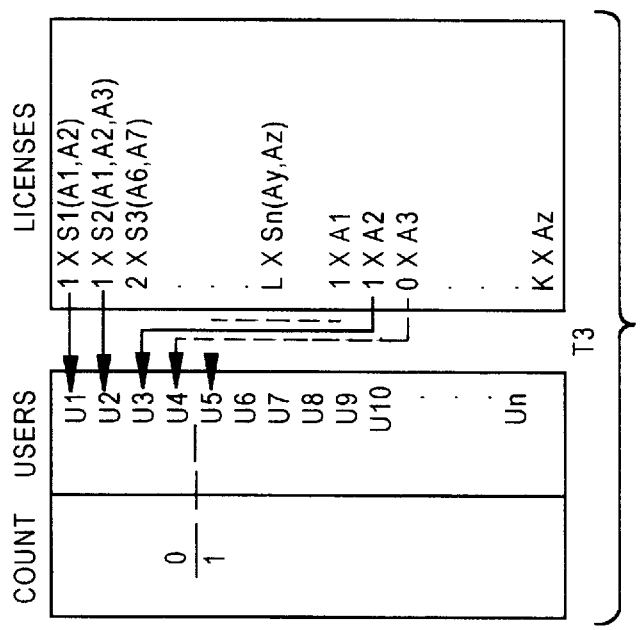
Figure 16E:
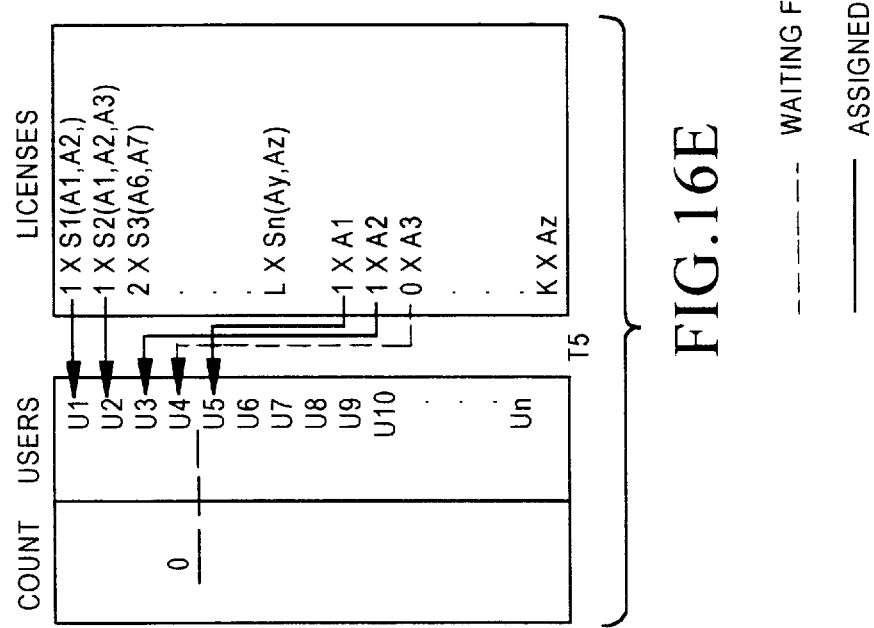

FIGS. 16A through 16E depict an example of a waiting list operation according to methods of FIGS. 14 and 15. The meaning of the items shown in FIGS. 16A through 16E are similar to those of FIGS. 7A through 7E, except that an additional column is provided to indicate the value of a counter for each user. As shown in FIG. 16A, at time T1, user U1 has launched A1 and A2 and has been given a suite license for suite S1. U2 has launched applications A1 and A2, and has been given suite license. User U3 has launched application A2 and has been given a single A2 license. At time T2, U4 requests launch of application A3 (indicated in FIG. 16B by the dotted arrow). It is determined that not enough licenses are available, so U4 is put on the waiting list for application A3. Since there are no other waiting users at this time, the counter for U4 is set to zero. At time T3 (FIG. 16C), user U5 requests launch of application A1. If there were no one on the waiting list, this would be a legal launch. However, since there is a waiting list in existence, users on the waiting list must first be checked. If it is attempted to allocate licenses to all users, including those currently running, those on the waiting list, and those requesting a launch, it is found that there are not enough licenses for all parties and thus user U5 is placed on the waiting list. U5's counter is set to 1, because there are still not enough licenses for the user directly ahead of U5 (namely, U4, still cannot gain a legal license). At time T4, user U4 has a heartbeat (FIG. 16D). There are not enough licenses for U4. Since this user is at the front of the waiting list, we assume that the "user just ahead of U4" is able to launch, and thus U4's counter is set to zero. Thus it is seen that the user at the front of the waiting list, based on time, will always have a count of zero. At time T5 (FIG. 16E), user U5 has a heartbeat. There are still not enough licenses for all parties on the waiting list, but there are enough for U5. There are not enough licenses for the user in front of U5 (i.e., user U4), therefore U5's counter is incremented to 2. Since U5's counter is greater than or equal to 2, and all users ahead of U5 on the waiting list had counters set to zero, user U5 is allowed to "cut ahead" in the waiting list and launch application A1. U4 remains on the waiting list for application A3.

The present invention is believed to decrease the average length of time that a user, placed on a waiting list, waits for a license, as compared to previous waiting list implementations. One such previous waiting list implementation will be referred, hereinafter, as a "simple application waiting queue" (SAWQ). An SAWO is one in which, when a user attempts to run an application and no license is available, the user is added to the end of a list of users waiting for a license to that application. According to SAWQ, as licenses are available, they are offered to the first person on the waiting queue and, if that user accepts the license, it is given to him. That person is removed from the list in any case and the user next in line in the queue now becomes the first in the queue. If the first person on the waiting queue in the initial configuration had rejected the offer of the license, it will be offered to the next person on the queue. In this way, licenses are awarded strictly according to the order that users attempted to run the application.

According to one embodiment of the invention, the license allocation analysis system can also be used for analyzing the current license availability and demand for automatically providing a recommendation regarding the purchase and/or return of licenses in order to best match the available licenses to the needs of users. One such recommendation scheme is depicted in FIG. 17. The initial portion 802 is similar to steps 802 depicted in FIG. 8, except for the change in the relative order of steps 824, 828, and 832, and will not be described further. If steps 802 indicate that the requesting user can legally use the application, then there is no need to change the current recommendation 1716. However, if it is determined that there are not enough licenses available to accommodate a new request 1726, then the current recommendation (i.e., any recommendation for license purchases calculated during previous passes through the system), is added to the total licenses available (for analysis purposes only) 1728, and the analysis system is restarted after setting the "Legal" flag to "False," the "Restarted" flag to "True," and the "Bad User" flag to "Null" 1730. Each user is considered in turn (e.g., by using the Index) 1731, 1732. Since this is a restart procedure 1734, the system computes the cost, for each user, that would be incurred if single licenses were purchased for all of this user's applications (including the requested application, when appropriate) 1736. Each user is considered in turn and given single licenses, if possible 1738, and, if not possible, suite licenses or a combination of suite and single licenses if available 1740. In the context of analyzing for license recommendation, the "giving" of a license to a user is only for purposes of performing the recommendation analysis and is not used as a basis for launching applications, except as described below.

If the user is given a suite license, then it is determined if the user's cost (i.e., the cost for filling the user's needs, assuming only single licenses are used) is less than the cost under the current license allocation, and whether a bad user "Flag" has been set 1742. If so, then the user currently being considered is marked as a "Bad User" 1744, indicating that the user is wasting money (i.e., that it would be cheaper to purchase single licenses than to purchase appropriate suite license), but that the user has, in fact, been given a suite license. If the user could be accommodated by all single licenses or if the user received a suite license, then the system returns to consider the next user 1732 or, if all users have been analyzed 1746 the "Legal" flag is examined. If the legal flag is "True," the requesting user can legally use the application and the application is launched. If the "Legal" flag is not equal to "True" 1752, the user cannot legally use the application and the system outputs a signal preventing the launch of the requested application 1754. If neither single licenses nor suite licenses are available to fill the needs of the user, then the recommendation for license purchases needs to be added-to, as depicted in FIG. 17B (provided the recommendation has not already been implemented in the current recommendation scheme) 1758.

Figures 2, 17A:
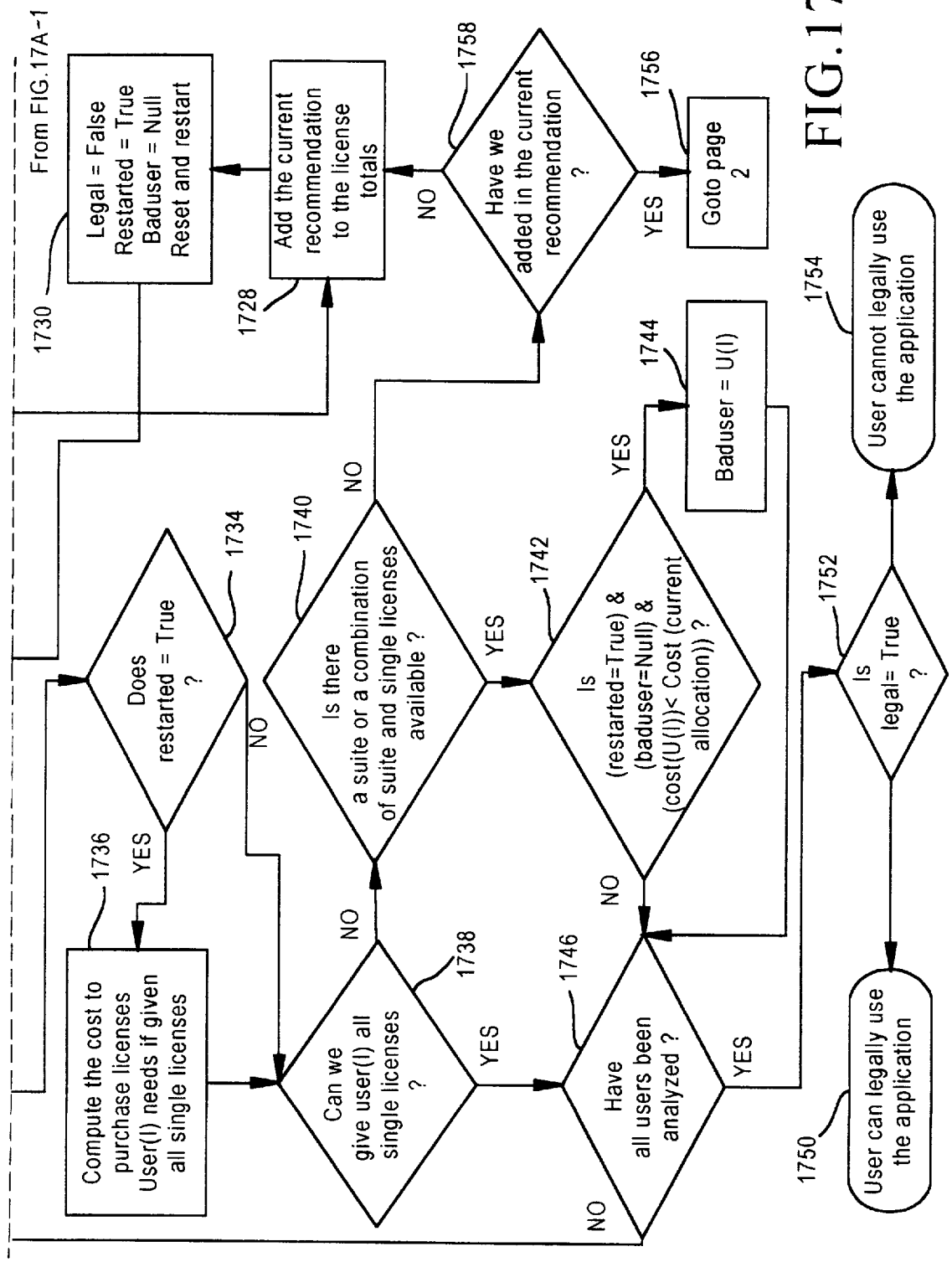
FIGS. 17A–17B depicts a recommendation process according to an embodiment of the present invention.
Figure 17B:
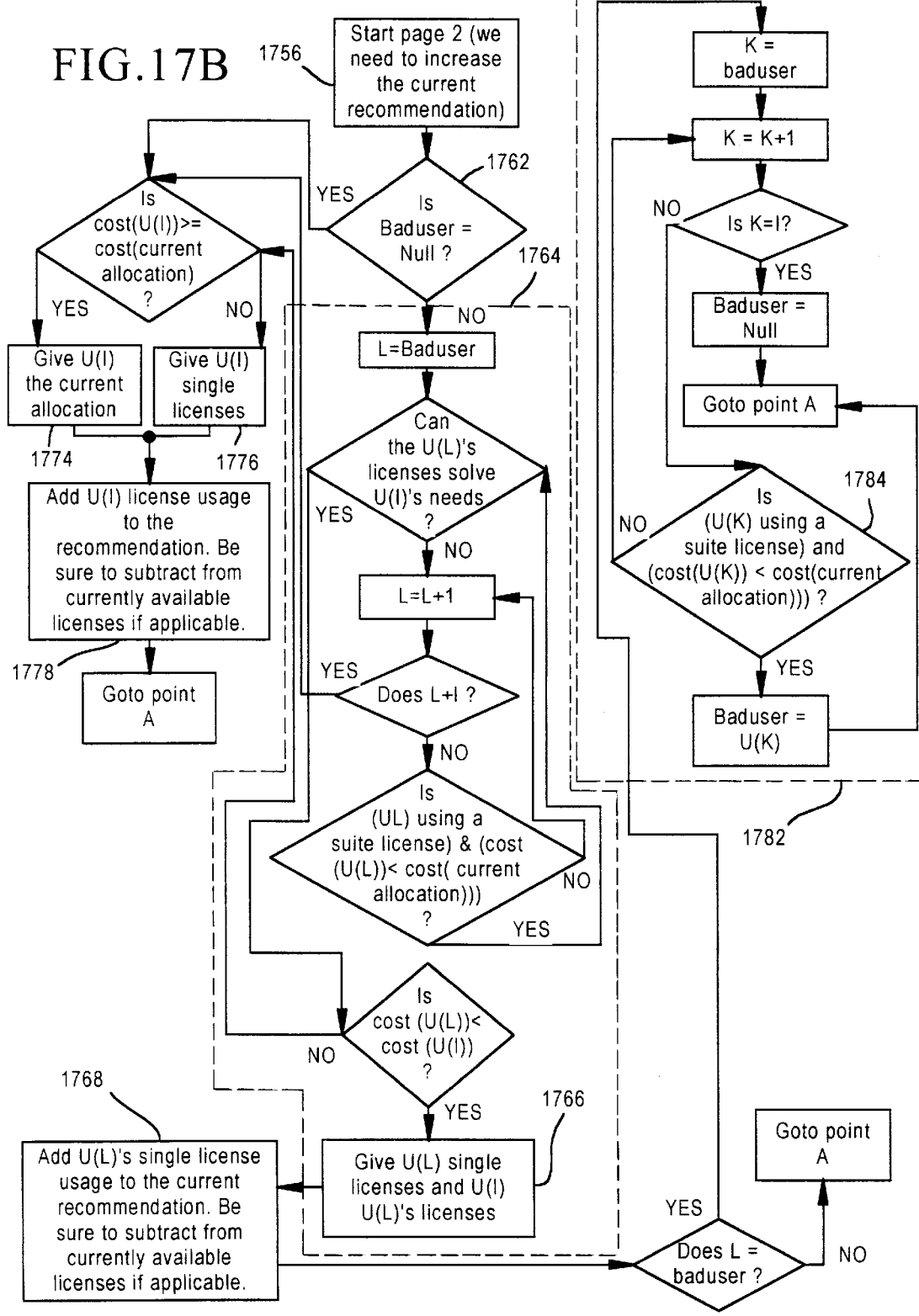

If there is at least one Bad User on the bad user list 1762, the cost for user U(I) (i.e., the user, which caused the method to branch to the process depicted in FIG. 17B) is checked to determine whether it is greater than the cost of a user between the Bad User and the current user. This is determined using steps 1764 which use variable L to loop through the users between the Bad User and the current user, since a paraticular Bad User may not have licenses that would fulfill the current user's needs. If so, then user U(I) would waste less money and, therefore, user U(I) is given the suite license and the Bad User is given single licenses 1766. The single licenses, which the Bad User would require, are added to the current recommendation, and subtracted from the currently available licenses, if applicable 1768. On the other hand, if there is not an identified Bad User or if user U(I)'s cost is greater than or equal to the cost for the Bad User, it is determined whether the cost for providing single application licenses to user U(I) is greater than or equal to the cost of the current allocation. If so, user U(I) is given a suite license 1774, and otherwise user U(I) is given single licenses 1776. User U(I)'s license usage is added to the recommendation and subtracted from the currently available licenses where applicable 1778. The system then returns to item 1732, in order to consider the next user.

If it was determined that the Bad User's cost was less than a single license cost of U (I), the system next determines if there is another Bad User (i.e., a user who is using a suite license and whose single license cost is less than the cost of the current allocation) 1784, in which case, this user is designated as a Bad User and the system returns to Block 1732 to consider the next user.

Figure 18A:
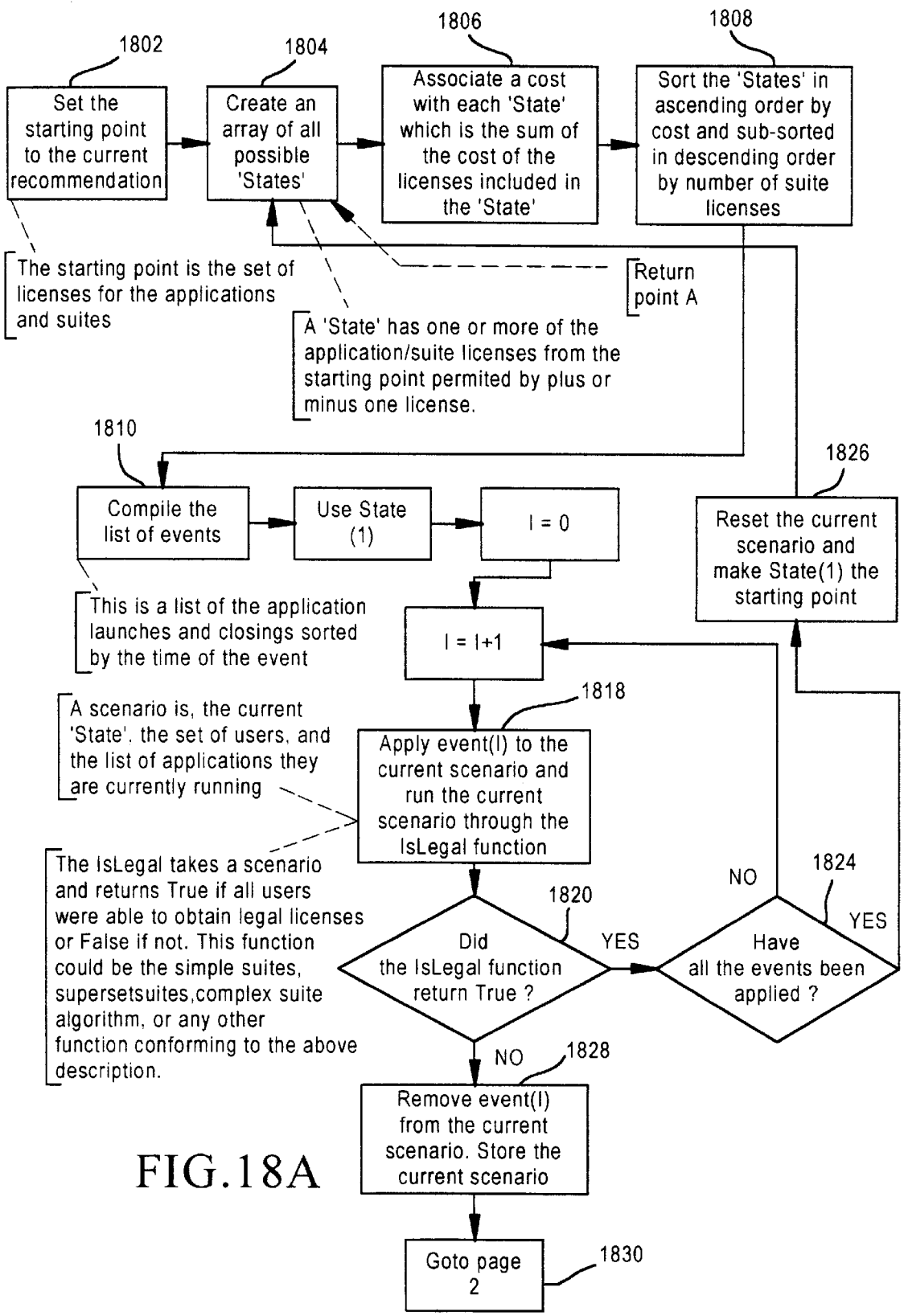
FIGS. 18A–18B depict a recommendation process according to an embodiment of the present invention.
Figure 18B:
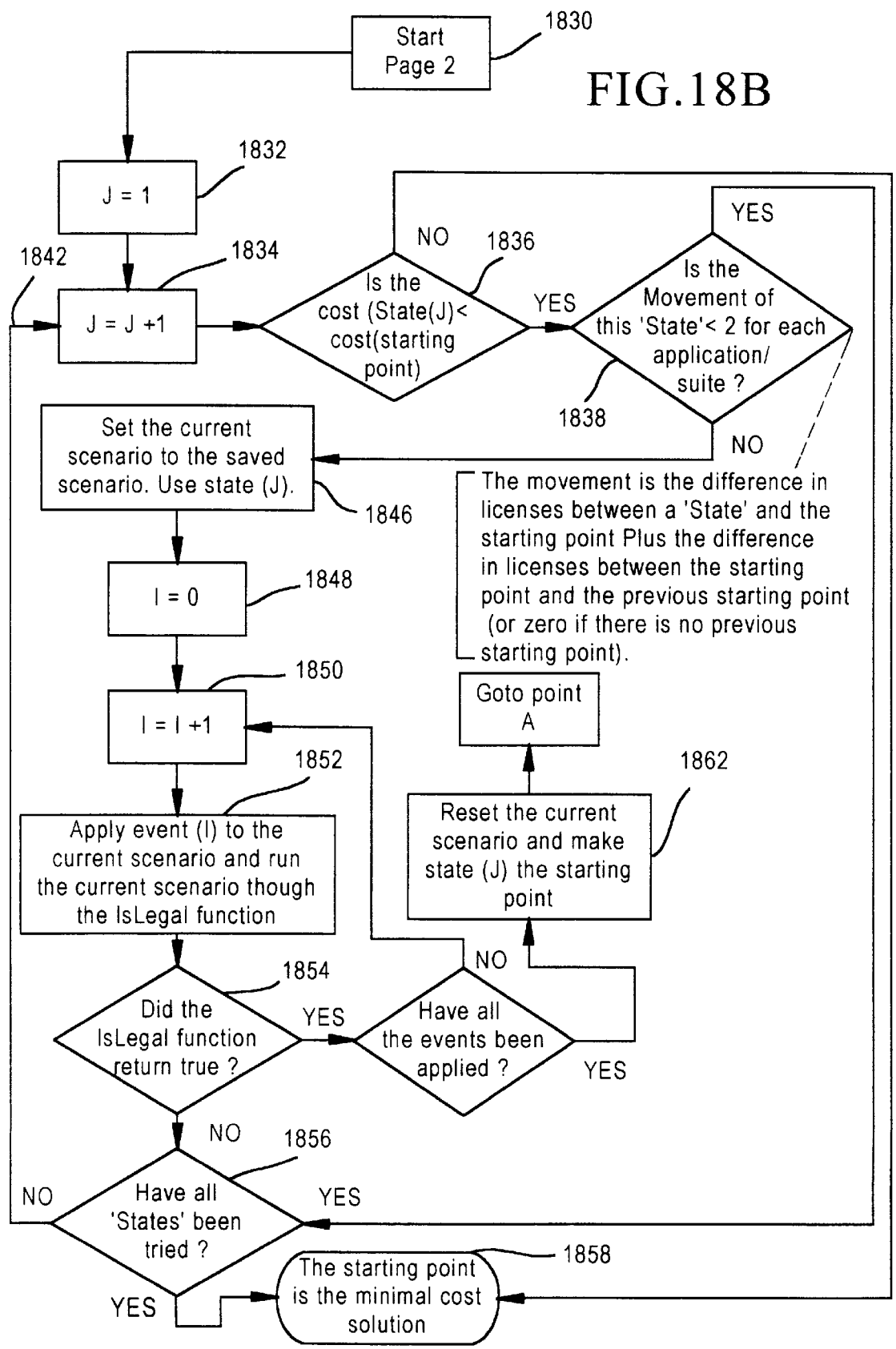

The method of FIGS. 17A and 17B results in a reasonable recommendation that can be incrementally created whenever a user launches an application. A more optimal solution or recommendation can be obtained starting with the most current incremental recommendation 1802 as depicted in FIG. 18A. The starting point 1802 includes a list of the users, the applications they launched and exited, and when these events occurred. The events are sorted in chronological order. The current recommendation is added to the actual license count to create a base state. The base state is used to create an array of all possible states (i.e., states similar to the base state but which have license counted permuted by plus or minus one license for one or more applications) 1804. The permuted states are sorted in order of increasing costs (ie., the cost to purchase all the licenses in the state) 1086 and subsorted by decreasing number of suite licenses 1808. Each state is then considered in turn.

For state number 1, all of the events in the list of events (i.e., all launches and closings sorted by time of event) are applied, one at a time, to the state. For example, starting from the initial state, the first event in the list of events is applied to the state, which results in a first scenario for that state. For each scenario, it is determined whether all users are able to obtain legal licenses (indicated by the "Legal" flag) 1818. Assuming the "Legal" flag indicates that the scenario was legal, the system loops through all of the events in the list of events 1824 or, if all events have been applied, resets the current scenario and sets state number 1 as the starting point 1826. If, however, one of the events resulted in the "Legal" flag being set to "false", that event is removed from the current scenario and the current scenario is stored 1828. Each state is then considered in turn (e.g., using Index J to identify a state) 1832, 1834. For each state, if the state costs as much as or more than the current state 1836, and the "movement" of the state is less than 2 for each application or suite 1838, (where the "movement" is the difference in licenses between the state and the starting point, plus the difference in licenses between the starting point and the previous starting point, or zero, if there is no previous starting point), then the next state is considered 1842. If the cost for the state is less than the cost for the current or starting point state, and the "movement" is greater than or equal to 2 for any application or suite, the events are analyzed one at a time, with the number of available licenses being assumed to be what is contained in the current state being considered 1846. Events are analyzed one at a time (e.g., using I as an index to identify the event) 1848, 1850, with each application "launch" checked to see if it is legal, using the "Legal" flag 1852. If any launch is determined to be illegal 1854, then the next state is considered 1842 (unless all states have been tried 1856, in which case the starting point is the minimal cost solution 1858. If all events have been applied and the state is determined to return a legal function for all states, then that state is considered the new base state 1862, and a new set of permuted states is created from the new base state 1804, and the analysis is repeated.

As one illustration of a recommendation scheme, according to the present invention, assume that suite S1 (containing applications A1 and A2) has one license, application A1 has zero licenses, and application A2 has zero licenses. The cost for a single license of either A1 or A2 is $150, and the cost for S1 is $200. In a situation in which the current recommendation is that the company should purchase one additional A1 license, the following events may occur. At time T1, user U1 runs A1, and is given suite S1 license. There is no need to adjust the recommendation. At time T2, user U2 runs A1. It is determined that this launch would be illegal, and the recommendation is updated. First the recommendation is added to the license count. When this is done, U1 is given a single A1 license, U2 is given a suite S1 license and marked as a Bad User, and the current recommendation does not need to be increased. At time T3, U3 launches A2. The launch would also be illegal and again, the recommendation is updated. The current recommendation is added to the license count. U1 is given a single A1 license, U2 is given a suite S1 license and marked as the Bad User. Even with the current recommendation added in, user U3 cannot obtain a license. Therefore, U3's cost of $150 is compared to the Bad User's cost of $150. The costs are equal, so having the Bad User give up its license would not improve the situation. Therefore, instead, U3's cost is compared to the cost of S1. U3's cost is less than the cost of S1, and so a single A2 license is given to U3 and added to the recommendation. At time T4 user U3 launches A1. Again, there are not enough licenses, so the current recommendation is added to the license count. U1 is given a single A1 license, U2 is given a suite S1 license, and marked as the Bad User, because U2's cost is less than the cost of S1. Now there are not enough single or suite licenses available for U3, so U3's cost is compared to the Bad User's cost. U3's cost of $300 is greater than the Bad User's cost of $150, so U2 gives up its suite S1 license to U3, and the Bad User's single A1 license need is added to the current recommendation.

As an example of a least cost or nearly optimal solution to the above example, the starting point is the recommendation that was in existence at the end of the previous example. This recommendation had two single A1 licenses, and one single A2 license. This recommendation is combined with the actual current license of suite S1, and is the base state. Permuted states are created as described above. The permuted states are sorted and the least cost state is the state consisting of one single A1 license, which is considered first. It is determined that this state cannot satisfy the four events (T1, T2, T3, and T4 in the previous example). The next state is considered, and at some point the state consisting of one suite S1 license and a two single A1 licenses is considered. It is determined that this state can satisfy the four events T1, T2, T3, T4, and has therefore made the base state and the permuted states are created based on the new base state. Once again, the states are sorted and considered in turn. This time none of the permuted states that cost less than the base state can satisfy all four events, and thus the base state is the optimal solution.

According to one embodiment of the invention, software embodying the invention is provided with a number of capabilities. The software can be provided in a trial configuration in which the system does the analysis to determine whether programs can be launched, but does not control program launches. This permits a user who is considering the program to evaluate its effectiveness without the program having any actual effect on program launches. The program outputs information to permit comparisons to be made, such as the number of users who were denied a launch request under an old system and who would have been allowed to launch using the present system, or the average wait time for a launch. The old system may be the common system of permanently assigning a particular license to a user (i.e. without the possibility of swapping licenses and without re-analyzing license availability when another application launch request is made), or the old system may be a license swapping and/or analysis system. The software can also be provided in an evaluation configuration in which the program performs analysis and controls program launches, but only for a limited time period, such as 30 days. This permits a user who is considering the program to see the effects of program launch control for a period of time, in actual use, as a basis for making a decision.

In one embodiment, the program is capable of changing its configuration or the level of performance (e.g. to reconfigure from a trial to an evaluation configuration, or from an evaluation configuration to an operational, non-time-limited configuration, or to reconfigure to change the number of users supported or to provide additional features such as the described license purchase recommendation) in response to input of a password. In this way, the program need only be installed once. When the user wishes to change the configuration (i.e. to change, e.g. from a time-limited analysis system to a non-time-limited analysis system), the user can pay the necessary fee to the vendor who will then provide the appropriate password so that the user can have access to the new configuration, without the need for loading additional software or otherwise initializing the program.

In some configurations it is useful for the system to obtain information regarding how actively a user is currently using an application. This is because situations can arise in which one user is denied a request to launch an application only because another user is "using" an application in only a minimal sense, e.g. is not providing input or receiving output to or from the application or otherwise interacting with the application. For example, the user may have minimized or "iconized" a windows™ application but without logging off or closing the application. Thus, the system recognizes that the user is still using the application in the sense that a license for the application is being used, even though the user is not actively providing input to or receiving output from the application.

Figure 20:
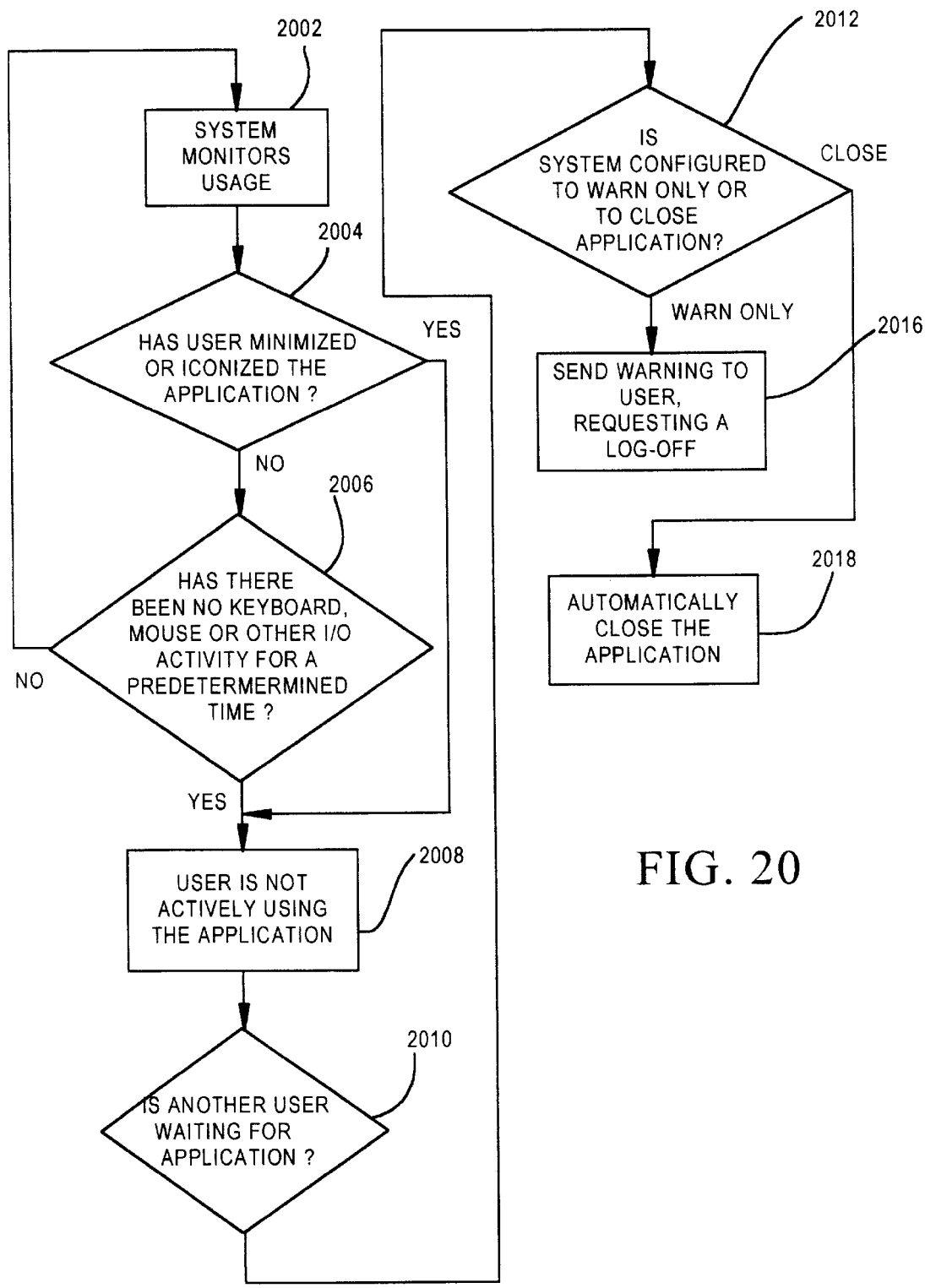
FIG. 20 depicts an activity monitoring process according to an embodiment of the present invention.

Accordingly, in one embodiment of the invention the system monitors usage of an application to determine how actively a user is using an application. For example, the system can determine when a user has minimized or iconized an application. Alternatively, the system may determine that a user is not actively using an application by monitoring input and output devices which may be associated with the application. For example, if the user has not used an input device such as a keyboard, mouse, voice actuated command, modem connection or the like in connection with this application for more than a predetermined period of time, the system may determine that the user is no longer actively using the application. One way of determining if input is "in connection with" a particular application is to make use of information that may be available from an operating system or interface. For example, in a windows™ environment, the windows interface recognizes input events which can be associated with (and provided to) particular applications. Preferably, the period of time which is selected as indicating that a user is not actively using an application can be set, e.g., by a systems administrator. Once it is determined that a user is not actively using an application 2010, the consequences of this determination depend upon how the system is configured. In one embodiment, a user who is not actively using an application for a predetermined period of time will be either logged off the application or sent a warning. In another embodiment, however, as depicted in FIG. 20, the system will first determine whether there are any other users waiting for this application 2010. In either case, the system can be configured to either send a warning or message to the user not actively using the application 2016 (e.g. requesting the user to log off the application so that another user can have access) or the system can be configured to automatically close the application that is not being actively used 2018.

In light of the above description, a number of advantages of the present invention can be seen. The present invention is able to accommodate the presence of suite licenses to assure that use of the application is within the boundaries of the various licenses for the software which is on the network. The present invention can efficiently handle a situation in which the network includes both suite licenses and individual licenses for the same application. The present invention is able to achieve these results in a relatively rapid fashion so that the user will not experience an unacceptable delay while awaiting analysis and approval of a request for an application. The present invention includes embodiments that are able to accommodate situations in which no suites overlap ("simple suites"), situations in which there are overlapping suites that are supersets of other suites ("superset suites") and situations in which there are overlapping suites which are not in a set/superset relationship ("complex suites"). Embodiments of the present invention are able to achieve these ends without the necessity for storing a record of which licenses are assigned to which users (although this information can be stored if required). In one embodiment, when a new application launch is requested, the database storing application use information is locked e.g., to avoid a situation in which a second application is requested while the analysis for the first application request is being processed. Without wishing to be bound by any theory, it is believed that the step of sorting the users by the number of running suite applications prior to performing other steps in the analysis is an important step in achieving the objectives of the invention, according to at least some of the described embodiments.

The embodiment depicted in FIG. 6 is believed to be an order N method in which the amount of time required is proportional to the number of users (N).

A number of variations and modifications of the present invention can also be used. It is possible that, when an analysis determines that a request for a new application launch cannot be accommodated, this information can be stored. In this way, if another request for the same application launch is made and there have been no other changes to the configuration (e.g., no users have exited programs). The request can be immediately denied without the need for further analysis. The present computer-implemented analysis and control can be used to analyze and control licenses other than software licenses, such as video or audio or multi-media use or playback or broadcast licenses, patent or other technology license (e.g. to control process or machines that can operate according to any of a plurality of licensed technologies. It is possible to provide a system which includes features of two or more of the above-described embodiments. For example, it is possible to use the relatively rapid license assignment method as depicted in FIG. 3 up until the point at which an assignment is not immediately available. At this point, new requests can be analyzed by one of the other embodiments such as the embodiments of FIGS. 6 or 8. When the system determines that an application launch cannot be accommodated, in addition to providing notice of this fact to the requesting user, other services can also be provided. For example, the system can periodically check for the ability to accommodate this request and send a notice or "callback" to the user when the user's request can be accommodated. The system could respond by indicating to the requesting user other options that might be available (e.g., if a user's request for a first word processor is not available, the system may notify the user that another brand of word processor is currently available). The system could also send messages to users requesting that users of the requested program exit the program if they are not currently in need of the program. In one embodiment, this message could be sent only to those users who have not apparently been using the program for more than a predetermined period of time. In the embodiments described above, when a request for a program launch is made, no other, later program launch requests are analyzed until after the analysis of the first program launch request is completed. It may be possible to modify the methods described above to accommodate simultaneous analysis of two or more requests so that it will not be necessary for the second requester to await completion of analysis of the first request before the second request is analyzed. The present invention can be used in connection with systems for analyzing the relative cost of licenses on the system. For example, when two or more options are available for accommodating all the users needs, the system may analyze the relative costs and select that option with the lowest cost. Furthermore, the system may retain statistics about license use and output recommendations regarding additional licenses that may be needed or licenses which are no longer needed and can be sold or otherwise disposed of. The software, according to one embodiment of the invention, is distributed in the sense that it is executed on the network clients, with the network server acting only to store the information (such as the database of FIGS. 4A and B) needed to perform the necessary analysis.

Although the invention has been described by way of a preferred embodiment and certain variations and modifications, other variations and modifications of the invention can also be used, the invention being defined by the following claims.

What is claimed is:

1. A method for managing network license compliance in a multi-user computer system comprising:

storing a plurality of applications;

storing information regarding a plurality of licenses for said plurality of applications, said information including the number of users licensed to use each of said plurality of applications, and wherein at least first and second licenses are suite licenses which allow a single user to use any or all of a plurality of applications within a suite and prohibit another user from using another one of the applications within the suite at the same time, wherein all applications in said first suite also appear in said second suite and wherein there is at least one application in said second suite which is not in said first suite;

in response to a request for a requested application by a requesting user, determining whether there is any distribution of said plurality of licenses among a plurality of users which includes at least said requesting user, wherein the assignment of said licenses is based upon the applications contained in said first and second suites, which would result in a license for each current user and a license for said requesting user; and outputting a signal preventing the launch of said requested application only if there is no distribution of said plurality of licenses among said plurality of users that would result in a license for each current user to use each application currently being used by said current user and would also include a license for said requesting user to use said requested application, and otherwise outputting a signal permitting the launch of said requested application.

2. A method for managing network license compliance in a multi-user computer system comprising:

storing a plurality of applications;

storing a plurality of user identifiers, each identifying a user;

storing information regarding a plurality of licenses for said plurality of applications, said information including the number of users licensed to use each of said plurality of applications, and wherein at least one license is a suite license allowing a single user to use any or all of a suite of said plurality of applications and prohibiting other users from using another application within the suite at the same time;

in response to a request for a requested application by a requesting user, (a) determining a trial set of applications which includes all currently running applications plus said requested application and identifying a plurality of users, including at least said requesting user and those users who are currently using said requested application, and defining a license pool initially containing said plurality of licenses for said plurality of applications;

(b) sorting the user identifiers for said plurality of users in order of the number of applications each user would be running if said requesting user is permitted to launch said requested application, to define a first order of users, (c) for each of said plurality of users, in order of said first order of users:

(i) assigning, from said license pool, non-suite licenses to said user if all applications used or requested by said user in said trial set have corresponding non-suite licenses in said license pool, wherein the licenses thus assigned from the license pool are deleted from the license pool;

(ii) if said non-suite licenses have not been assigned to said user, assigning, from said license pool, a combination of licenses to said user, including at least one suite license, wherein, if more than one combination of licenses was available for said user, there remains, after assigning a combination to said user, at least one combination not assigned to said user which, had it been assigned to said user, would have included a number of unused licenses which is greater than or equal to the number of unused licenses in the combination which was assigned to said user; and (d) if any of said plurality of users is running or has requested an application which is not assigned a license under (i) or (ii), outputting an indication that a license is not currently available for the requesting user's requested application.

3. A method, as claimed in claim 2, wherein said plurality of applications includes at least one application for which there is both a suite license and a non-suite license among said plurality of licenses.

4. A method for managing network license compliance in a multi-user computer system comprising:

storing a plurality of applications;

storing a plurality of user identifiers, each identifying a user;

storing information regarding a plurality of licenses for said plurality of applications, said information including the number of users licensed to use each of said plurality of applications, and wherein at least one license is a suite license allowing a single user to use any or all of a suite of said plurality of applications and prohibiting another user from using at the same time another of the applications within the suite;

in response to a request for a requested application by a requesting user, (a) determining a trial set of applications which includes all currently running applications plus said requested application and identifying a plurality of users, including at least said requesting user and those users who are currently using said requested application, and defining a license pool initially containing said plurality of licenses for said plurality of applications;

(b) sorting the user identifiers for said plurality of users in order of the number of applications each user would be running if said requesting user is permitted to launch said requested application, to define a first order of users (c) for each of said plurality of users, in order of said first order of users:

(i) assigning, from said license pool, non-suite licenses to said user if all applications used or requested by said user in said trial set have corresponding non-suite licenses in said license pool, wherein the licenses thus assigned from the license pool are deleted from the license pool;

(ii) if said non-suite licenses have not been assigned to said user, assigning, from said license pool, a combination of licenses to said user, including at least one suite license, wherein, if more than one combination of licenses was available for said user, there remains after assigning a combination to said user, at least one combination not assigned to said user which, had it been assigned to said user, would have included a number of unused licenses which is greater than or equal to the number of unused licenses in the combination which was assigned to said user; and (d) if any of said plurality of users is running or has requested an application which is not assigned a license under (i) or (ii), outputting an indication that a license is not currently available for the requesting user's requested application.

5. A method, as claimed in claim 4, wherein step (c) (ii) includes, if more than one combination of licenses is available for said user, assigning a combination which has fewer unused licenses than any other combination.

6. A method for managing network license compliance in a multi-user computer system comprising:

storing a plurality of applications;

storing a plurality of user identifiers, each identifying a user;

storing information regarding a plurality of licenses for said plurality of applications, said information including the number of users licensed to use each of said plurality of applications, and wherein at least first and second licenses are suite licenses allowing a single user to use any or all of first and second suites of said plurality of applications, respectively, wherein there is at least one application in said first suite which is not said second suite and wherein there is at least one application in said second suite which is not in said first suite, and prohibiting other users from using another application within the suite at the same time, wherein those applications being run by or requested by a user define the user's needs and wherein a user's needs are filled by the assignment of licenses which cover at least all applications being run by or requested by the user;

in response to a request for a requested application by a requesting user, determining whether there is any distribution of said plurality of licenses among a plurality of users which includes at least said requesting user, which would result in a license for each current user and a license for said requesting user; and outputting a signal preventing the launch of said requested application only if there is no distribution of said plurality of licenses among said plurality of users that would result in a license for each current user to use each application currently being used by said current user and would also include a license for said requesting user to use said requested application, and otherwise outputting a signal permitting the launch of said requested application.

7. A method for managing network license compliance in a multi-user computer system comprising:

storing a plurality of applications;

storing a plurality of user identifiers, each identifying a user;

storing information regarding a plurality of licenses for said plurality of applications, said information including the number of users licensed to use each of said plurality of applications, and wherein at least one license is a suite license allowing a single user to use any or all of a suite of said plurality of applications, and prohibiting other users from using another application within the suite at the same time, wherein those applications being run by or requested by a user define the user's needs and wherein a user's needs are filled by the assignment of licenses which cover at least all applications being run by or requested by the user;

in response to a request for a requested application by a requesting user, (a) assigning licenses to a plurality of users, including assigning sets of licenses to those users who do not have needs which can be filled by more than one set of licenses;

(b) if any users have licensing needs that are not filled following step (a), allocating licenses to users by selecting, for a given user, sets of licenses from among those sets which can fill the needs of the given user; and (c) if any of said plurality of users is running or has requested an application which is not assigned a license by steps (a) or (b), outputting an indication that a license is not currently available for the requesting user's requested application.

8. A method, as claimed in claim 7, wherein step a. comprises:

a. determining a trial set of applications which includes all currently running applications plus said requested application and identifying a plurality of users, being those users who are currently using or who have requested an application;

b. sorting the user identifiers for said plurality of users in order of the number of applications each user would be running if said requesting user is permitted to launch said requested application, to define a first order of users;

c. performing a first pass procedure which includes:

i. for each of said plurality of users, in order of said first order of users, (1) assigning a suite license to said user if all of said user's needs are completely filled by said suite license;

(2) assigning a single license to said user if said user is running a single application and a single license is available for that application;

(3) assigning a set of licenses to said user if there is no other set of licenses that will fill the user's needs;

d. performing a second pass procedure if, following step (3), there are users whose needs have not been filled by assigned licenses, wherein said second pass procedure includes
   i. for each of said plurality of users whose needs have not be filled by assigned licenses, in order of said first order of users, assigning a set of licenses to said user if there are no other sets of unassigned licenses that will fill the user's needs; and
e. repeating step d. until there is a repetition of step d. during which no license assignments are made.

9. A method, as claimed in claim 7, wherein step b. comprises
   sorting the user identifiers for a sub-plurality of said plurality of users, said sub-plurality including those users whose needs have not been met by assigned licenses in order of the number of sets of available licenses which can be used to meet the user's needs, to define a second order of users, said second order defining a first user;
   analyzing, in tree fashion, license assignment scenarios for all of said sub-plurality of users until either an assignment scenario results filling the needs of all of said sub-plurality of users or no option available to said first user is consistent with a scenario which fills the needs of all of said sub-plurality of users.

10. A method for managing network license compliance in a multi-user computer system comprising:
   storing a plurality of applications;
   storing a plurality of user identifiers, each identifying a user;
   storing information regarding a plurality of licenses for said plurality of applications, said information including the number of users licensed to use each of said plurality of applications;
   in response to a request for a requested application by a requesting user,
     (a) sorting said user identifiers for said plurality of users in order of the number of applications each user would be running if said requesting user is permitted to launch said requested application, to define a first order of users;
     (b) for each of said plurality of users, in order of said first order of users, determining whether that user's computing needs can be fulfilled within said plurality of licenses;
     (c) if any of said plurality of users has needs that can not be fulfilled within said plurality of licenses, placing the requesting user list on a waiting list; and
   checking whether the requested application can be launched wherein said checking avoids allowing said requesting user to launch said requested application prior to permitting launch of a prior requested application requested by a first user who was placed on said waiting list before said requesting user and whose computing needs could be fulfilled within said plurality of licenses if said requesting user is not allowed to launch said requested application.

11. A method, as claimed in claim 10, wherein said computer system is configured to use either of a first or second license analysis system, and further comprising:
   receiving a first password in said computer system;
using said second analysis system if said first password has a first value and otherwise, using said first analysis system.

12. A method, as claimed in claim 11, wherein said first and second analysis system differ by accommodating different maximum numbers of users.

13. A method, as claimed in claim 11, wherein said first and second analysis systems have different capabilities.

14. A method, as claimed in claim 10, wherein said multi-user computer system is a plurality of networked computers operating according to a network protocol and wherein said computer-implemented method includes executing first software code and wherein said computer-implemented method can be performed using either a first network protocol or a second network protocol, substantially without modification of said first software code.

15. A method for managing network license compliance in a multi-user computer system comprising:
   storing a plurality of applications;
   storing a plurality of user identifiers, each identifying a user;
   storing information regarding a plurality of licenses for said plurality of applications, said information including the number of users licensed to use each of said plurality of applications, and wherein at least one license is a suite license allowing a single user to use any or all of a suite of said plurality of applications, and prohibiting other users from using another application within the suite at the same time;
   in response to a request for a requested application by a requesting user,
     (a) determining a trial set of applications which includes all currently running applications plus said requested application and identifying a plurality of users, being those users who are currently using or have requested an application, and defining a license pool initially containing said plurality of licenses for said plurality of applications;
     (b) sorting the user identifiers for said plurality of users in order of the number of applications each user would be running if said requesting user is permitted to launch said requested application, to define a first order of users
     (c) for each of said plurality of users, in order of said first order of users:
       (i) assigning, from said license pool, non-suite licenses to said user if all applications used or requested by said user in said trial set have corresponding non-suite licenses in said license pool, wherein the licenses thus assigned from the license pool are deleted from the license pool;
       (ii) if said non-suite licenses have not been assigned to said user, assigning, from said license pool, at least one suite license, if said at least one suite license corresponds to the applications used or requested by said user;
     (d) if any of said plurality of users is running or has requested an application which is not assigned a license under (i) or (ii),placing the requesting user on a waiting list; and
   checking whether the requested application can be launched wherein said checking avoids allowing said requesting user to launch said requested application prior to permitting launch of a prior requested application requested by a first user who was placed on said waiting list before said requesting user and whose computing needs could be fulfilled within said plurality of licenses if said requesting user is not allowed to launch said requested application.

16. A method for managing network license compliance in a multi-user computer system comprising:
   storing a plurality of applications;

storing a plurality of user identifiers, each identifying a user;

storing information regarding a plurality of licenses for said plurality of applications, said information including the number of users licensed to use each of said plurality of applications;

determining whether an application requested by a requesting user can be launched without violating the licenses for said applications;

placing the requesting user on a waiting list is said application requested by said requesting user can not be launched without violating the licenses for said applications; and checking whether the requested application can be launched wherein said checking avoids allowing said requesting user to launch said requested application prior to permitting launch of a prior requested application requested by a first user who was placed on said waiting list before said requesting user and whose computing needs could be fulfilled within said plurality of licenses if said requesting user is not allowed to launch said requested application.

17. A method, as claimed in claim 16, wherein at least one license is a suite license allowing a user to use any or all of a suite of said plurality of applications, and wherein said plurality of licenses can include non-suite licenses and wherein said step of checking includes:

launching said requested application after determining that there sufficient licenses available for the requested application and for all applications requested by users who are on said waiting list and who are waiting for applications which belong to at least one suite which includes said requested application.

18. A method, as claimed in claim 16 further comprising:

launching said requested application, even though there is at least one other user on said waiting list who can not currently launch said application, if there is a license available for said requesting user to use said requested application.

19. A method, as claimed in claim 16 wherein said step of launching is performed only after at least a first predetermined delay following the request made by said requesting user.

20. A method for managing network license compliance in a multi-user computer system comprising:

storing a plurality of applications;

storing information regarding a plurality of licenses for said plurality of applications, said information including the number of users licensed to use each of said plurality of applications;

determining whether an application requested by a requesting user can be launched without violating the licenses for said applications; and storing an indication of the additional license purchases that would fulfill the needs of said requesting user, if said application requested by said requesting user can not be launched without violating the licenses for said applications.

21. A method, as claimed in claim 20, further comprising:

storing an indication of the additional license purchases that would fulfill the needs of a plurality of requesting users over a first time period;

calculating a first cost, being the cost for mailing said additional license purchases checking whether at least one plurality of license purchases, different from said additional license purchases, would fulfill the needs of said plurality of requesting users over said first time period, at a cost lower than said first cost.

22. A method for managing network license compliance in a multi-user computer system comprising:

storing a plurality of applications;

storing information regarding a plurality of licenses for said plurality of applications, said information including the number of users licensed to use each of said plurality of applications;

analyzing license availability, using a first license analysis system, in response to each of a plurality of requests for launching one of said plurality of applications, to provide a first license analysis result;

storing said first license analysis result;

launching a plurality of said applications using a second license analysis system to provide a second license analysis result; and comparing said first license analysis result and said second license analysis result.

23. A method, as claimed in claim 22, wherein said first license analysis results are provided without using said first license analysis results to control launches of said plurality of applications.

24. A method, as claimed in claim 22, wherein said second system includes permanently assigning a particular license to a user.

25. a method for managing network license compliance in a multi-user computer system, including determining whether an application is being effectively utilized by a user, comprising:

storing a plurality of applications;

storing information regarding a plurality of licenses for said plurality of applications, said information including the number of users licensed to use each of said plurality of applications;

in response to a request for a requested application by a requesting user, outputting a signal permitting the launch of said requested application only if, following said launch of said requested application, all running applications, among said plurality of applications, are covered by said plurality of licenses;

monitoring input events in connection with said running applications, among said plurality of applications; and outputting a first signal if more than a predetermined time has elapsed during which there have been no input events in connection with at least one of said running applications.

26. A method, as claimed in claim 25, wherein said first signal includes information identifying said at least one running application, in connection with which there have been no input events for said predetermined period of time.

27. A method, as claimed in claim 26, further comprising sending a message to at least a first of said plurality of users, reminding the user to log-off unused applications.

28. A method, as claimed in claim 26, further comprising sending a message to at least a first of said plurality of users, who is using said at least one running application if a second user has been denied a request to launch said at least one running application.

29. A method, as claimed in claim 26, further comprising automatically closing an application in response to said first signal.

30. A method, as claimed in claim 26, further comprising automatically closing said at least one running application after outputting said first signal.

31. a method for managing network license compliance in a multi-user computer system comprising:

storing a plurality of applications;

storing information regarding a plurality of licenses for said plurality of applications, said information including the number of users licensed to use each of said plurality of applications;

determining whether an application requested by a requesting user can be launched without violating the licenses for said applications;

placing the requesting user on a waiting list if said application requested by said requesting user can not be launched without violating the licenses for said applications; and checking whether the requested application can be launched wherein the average time a user waits for a license is less than the average time using a Simple Application Waiting Queue (SAWQ) system.

32. a computer readable medium containing a computer program which when run on a computer system causes the system to perform a network license compliance method comprising the steps of:

storing a plurality of applications;

storing information regarding a plurality of licenses for said plurality of applications, said information including the number of users licensed to use each of said plurality of applications, and wherein at least first and second licenses are suite licenses allowing a single user to use any or all of first and second suites of said plurality of applications, respectively, and prohibiting other users from using another application within a suite at the same time, wherein all applications in said first suite are in said second suite and wherein there is at least one application in said second suite which is not in said first suite;

in response to a request for a requested application by a requesting user, determining whether there is any distribution of said plurality of licenses among a plurality of users which includes at least said requesting user, which would result in a license for each current user and a license for said requesting user; and outputting a signal preventing the launch of said requested application only if there is no distribution of said plurality of licenses among said plurality of users that would result in a license for each current user to use each application currently being used by said current user and would also include a license for said requesting user to use said requested application, and otherwise outputting a signal permitting the launch of said requested application.

33. A device for managing network license compliance in a multi-user computer system comprising:

means for storing a plurality of applications;

means for storing information regarding a plurality of licenses for said plurality of applications, said information including the number of users licensed to use each of said plurality of applications;

means for determining, in response to a request for a requested application by a requesting user, whether there is any distribution of said plurality of licenses among a plurality of users which includes at least said requesting user, which would result in a license for each current user and a license for said requesting user; and means for outputting a signal preventing the launch of said requested application only if there is no distribution of said plurality of licenses among said plurality of users that would result in a license for each current user to use each application currently being used by said current user and would also include a license for said requesting user to use said requested application, and otherwise outputting a signal permitting the launch of said requested application.

* * * * *